US012749373B2

(12) United States Patent
Amaitis et al.

(10) Patent No.: US 12,749,373 B2
(45) Date of Patent: Sep. 29, 2026

(54) WAGER SELL BACK OPTION

(71) Applicant: CFPH, LLC, New York, NY (US)

(72) Inventors: Lee Amaitis, Las Vegas, NV (US); Andrew Garrood, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 288 days.

(21) Appl. No.: 18/434,962

(22) Filed: Feb. 7, 2024

(65) Prior Publication Data

US 2024/0177565 A1 May 30, 2024

Related U.S. Application Data

(63) Continuation of application No. 18/127,782, filed on Mar. 29, 2023, now abandoned, which is a continuation of application No. 16/797,060, filed on Feb. 21, 2020, now abandoned, which is a continuation of application No. 14/485,646, filed on Sep. 12, 2014, now abandoned, which is a continuation-in-part of application No. 14/025,236, filed on Sep. 12, 2013, now abandoned.

(51) Int. Cl.
*G07F 17/32* (2006.01)
*G06Q 50/34* (2012.01)

(52) U.S. Cl.
CPC ......... *G07F 17/3244* (2013.01); *G06Q 50/34* (2013.01); *G07F 17/3288* (2013.01)

(58) Field of Classification Search
CPC .. G07F 17/3244; G07F 17/3288; G06Q 50/34
USPC ........................................................... 463/25
See application file for complete search history.

(56) References Cited

U.S. PATENT DOCUMENTS

| | | | | |
|---|---|---|---|---|
| 8,475,267 B1 * | 7/2013 | Brook | G07F 17/3246 463/25 |
| 2009/0069075 A1 * | 3/2009 | Silvestro | G07F 17/3225 463/25 |
| 2015/0105142 A1 * | 4/2015 | Amaitis | G07F 17/3244 463/25 |
| 2020/0193770 A1 * | 6/2020 | Amaitis | G06Q 50/34 |
| 2023/0237875 A1 * | 7/2023 | Amaitis | G06Q 50/34 463/25 |

FOREIGN PATENT DOCUMENTS

| | | |
|---|---|---|
| TW | 200642728 | 12/2006 |

* cited by examiner

*Primary Examiner* — Pierre E Elisca

(57) ABSTRACT

A user may purchase an option to cancel a wager in exchange for a refund amount. In purchasing the option, the user may select an exercise time from a plurality of exercise times, each exercise time having an associated price, which price may be the price of the option. The refund amount associated with each exercise time may be the same amount. Responsive to a user exercising a purchased option, a determination may be made as to whether the time of exercise is at least prior to the selected exercise time. If so, the wager may be canceled in exchange for the refund amount.

15 Claims, 14 Drawing Sheets

PRIOR ART

WAGER SELL BACK OPTION

CROSS REFERENCE TO RELATED APPLICATIONS

This application is a continuation of U.S. patent application Ser. No. 18/127,782 filed Mar. 29, 2023, which is a continuation of U.S. patent application Ser. No. 16/797,060 filed Feb. 21, 2020, which is a continuation of U.S. patent application Ser. No. 14/485,646 filed Sep. 12, 2014, which is a continuation-in-part of U.S. patent application Ser. No. 14/025,236 filed Sep. 12, 2013, each of which is hereby incorporated herein by reference in its entirety.

FIELD

This disclosure generally relates to wagering.

BACKGROUND

An organization, company, institution, or other entity that accepts bets or places wagers for bettors on the general outcome of events (e.g., on scores or other attributes of sporting events) is referred to as a sports book. The role of the sports book is to act as a market maker for sports wagers. The sports book accepts wagers placed on either team or competitor, and may maintain a point spread which aims to ensure a profit (i.e., the vigorish) for the sports book, e.g., regardless of the outcome of the wager, e.g., by attempting to attract an equal dollar amount of wagers for each team or competitor of a particular event. Sports books in general are continually striving to improve profits, e.g., while maintaining current bettors' interest and attracting new bettors.

SUMMARY

According to one example, a request to place a wager on an event may be received from a user. An option to cancel the wager in exchange for a refund amount may be presented for purchase to the user. Presenting the option may include presenting for selection by the user at least a first exercise time and a second exercise time, the first exercise time having a first fee associated therewith and the second exercise time having a second fee associated therewith. A price of the option may be based on the fee associated with the exercise time selected by the user. Selection of the first exercise time may allow the user to cancel the wager at least prior to the first exercise time in exchange for the refund amount, and selection of the second exercise time may allow the user to cancel the wager at least prior to the second exercise time in exchange for the refund amount. The refund amount associated with each of the first and second exercise times may be the same amount. An indication may be received that the user is purchasing the option. With the purchase, a selection by the user of either the first exercise time and/or the second exercise time may also be received. An indication may be recorded (such as in/on a memory device, paper, etc.) that the user has paid for the option, the price of the option being based on, for example, the fee associated with the exercise time selected by the user. An indication may be received that the user is exercising the option. A determination may then be made as to when the indication is received as compared to the exercise time. If the indication is received at least prior to the selected exercise time, the wager may be canceled in exchange for the refund amount. In the alternative, if the indication is received after the selected exercise time, for example, the option may expire, the user's wager may remain in place/not be canceled, and the user may either win or lose the wager based on the outcome of the event wagered on. As another alternative, the selected exercise time may pass without the user exercising the option/without receiving an indication that the user is exercising the option. Again, the option may expire, the user's wager may remain in place/may not be canceled, and the user may either win or lose the wager based on the outcome of the event wagered on.

According to another and/or additional example, a request to place a wager on an event may be received from a user. A plurality of options to cancel the wager in exchange for a refund amount may be presented to the user, the plurality of options including at least a first option and a second option. The first option may have associated therewith a first exercise time and a first price, and the second option may have associated therewith a second exercise time and a second price. Selection of the first option may allow the user to cancel the wager at least prior to the first exercise time in exchange for the refund amount, and selection of the second option may allow the user to cancel the wager at least prior to the second exercise time in exchange for the refund amount. The refund amount associated with each of the first and second options may be the same amount. An indication may be received that the user is purchasing at least one of the first option and the second option. An indication may be received that the user is exercising the purchased option. A determination may then be made as to when the indication is received as compared to the exercise time associated with the purchased option. If the indication is received at least prior to the exercise time associated with the purchased option, the wager may be canceled in exchange for the refund amount. In the alternative, if the indication is received after the exercise time associated with the purchased option, for example, the option may expire, the user's wager may remain in place/not be canceled, and the user may either win or lose the wager based on the outcome of the event wagered on. As another alternative, the exercise time associated with the purchased option may pass without the user exercising the purchased option/without receiving an indication that the user is exercising the purchased option. Again, at the option may expire, the user's wager may remain in place/may not be canceled, and the user may either win or lose the wager based on the outcome of the event wagered on.

According to another and/or additional example, a request to place a wager on an event may be received from a user. An option to cancel the wager may be presented for purchase to the user for a price. The option may include a plurality of exercise times including at least a first exercise time and a second exercise time. The first exercise time may have a first refund amount associated therewith and the second exercise time may have a second refund amount associated therewith. The second exercise time may be subsequent to the first exercise time. The option may allow the user to cancel the wager prior to and/or at the first exercise time in exchange for the first refund amount, and/or to cancel the wager at and/or after the first exercise time and prior to and/or at the second exercise time in exchange for the second refund amount. An indication may be received that the user is purchasing the option. An indication may be received that the user is exercising the option. A determination may then be made as to when the indication is received as compared to the exercise times associated with the option. If the indication is received prior to and/or at the first exercise time associated with the option, the wager may be canceled in exchange for the first refund amount. If the indication is received at and/or after the first exercise time and prior to and/or at the second exercise time associated with the option, the wager may be canceled in exchange for the second refund amount. In the alternative, if the indication is received at and/or after the second exercise time associated with the option, the option may expire, the user's wager may remain in place/not be canceled, and the user may either win or lose the wager based on the outcome of the event wagered on. As another alternative, all exercise times associated with the option may pass without the user exercising the option/without receiving an indication that the user is exercising the option. Again, the option may expire, the user's wager may remain in place/may not be canceled, and the user may either win or lose the wager based on the outcome of the event wagered on.

According to another and/or additional example, a request to place a wager on an event may be received from a user. An option to cancel the wager may be presented for purchase to the user for a price. An indication may be received that the user is purchasing the option. An indication may be received that the user is exercising the option. Responsive to the user exercising the option, the wager may be canceled in exchange for a refund amount. The user may be required to use at least a portion of the refund amount to place another wager.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
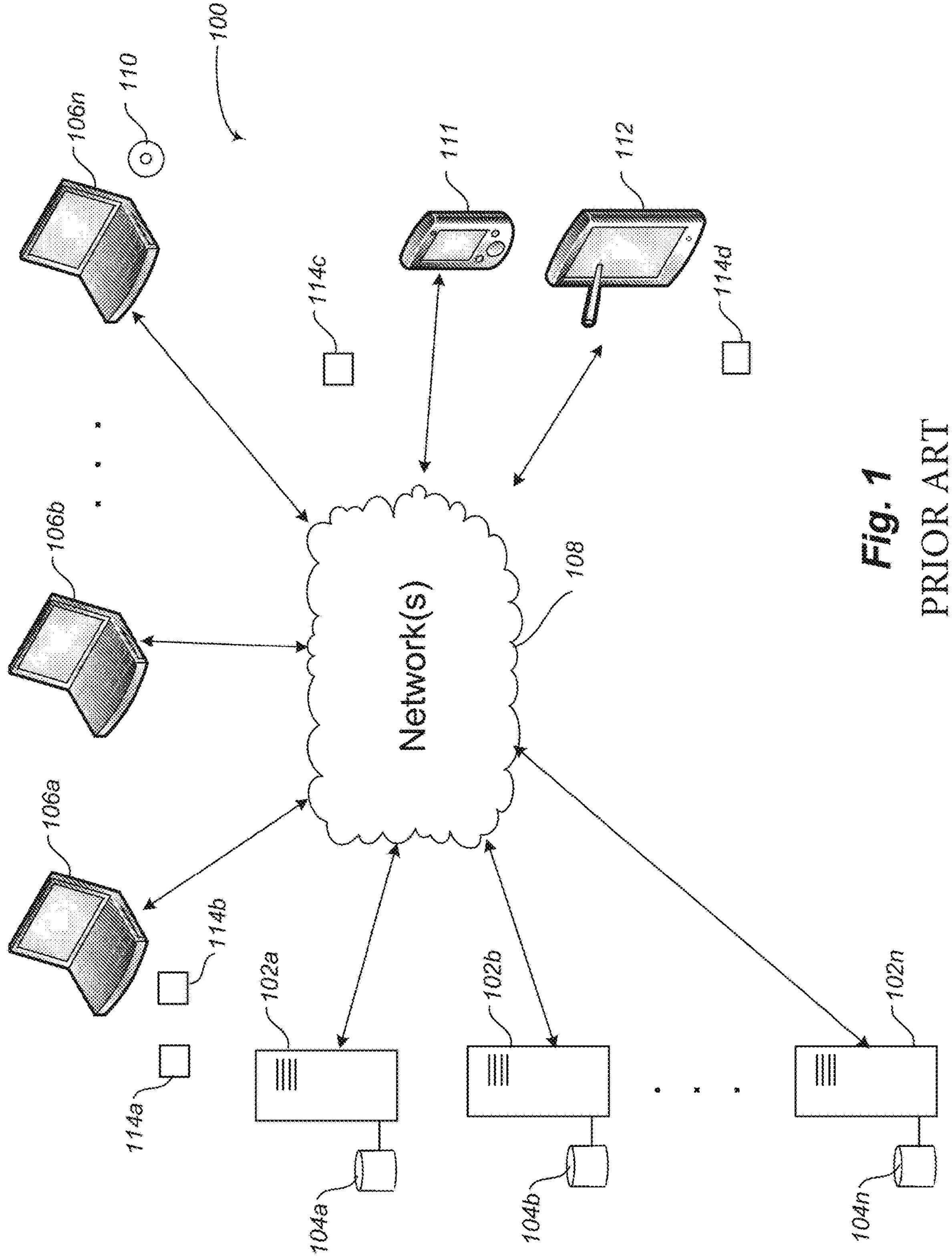
Fig. 1 PRIOR ART
FIG. 1 is a schematic diagram of a networked environment, including a number of servers and a number of clients communicatively coupled to the servers by one or more networks, of which systems, devices and methods for electronic sports book wagering may be a part, or in which they may be implemented, according to one illustrated embodiment.

FIG. 1 shows a networked environment 100, including a number of servers and a number of clients communicatively coupled to the servers by one or more networks, of which systems, devices and methods for electronic sports book wagering may be a part, or in which they may be implemented, according to one illustrated embodiment.

The network environment 100 includes a number of server computing systems 102*a*-102*n* (collectively 102). The server computing systems 102 include processors that execute server instructions (i.e., server software) stored on computer-readable storage media to provide server functions in the network environment 100. For example, the server computing systems 102 may electronically generate, place, execute and/or track sports book wagers and sports book ticket sell back options and related transactions; determine refund amounts for exercising sports book ticket sell back options; and/or receive input regarding indications of sports book wagers and sports book ticket sell back options and related transactions stored in one or more databases or other computer-readable storage media 104*a*-104*n* (collectively 104). The term sports book used herein means any service related to placing wagers or tracking wagers placed on the outcomes of or otherwise related to sporting events, such as football, basketball, baseball, soccer, or any other sporting event, game or match, horse racing, political events, competitions, contests, activities of public figures, activities of celebrities, etc., including any public event on which the sports book offers opportunities to bet.

The network environment 100 includes a number of client computing systems 106*a*-106*n* (collectively 106) selectively communicatively coupled to one or more of the server computing systems 102 via one or more communications networks 108. The client computing systems 106 include one or more processors that execute one or more sets of communications instructions stored on any of a variety of non-transitory computer-readable storage media 110 (only one illustrated in FIG. 1). The client computing systems 106 may take a variety of forms, for instance desktop, laptop or notebook personal computers, tablet computers, workstations, mini-computers, mainframe computers, or other computational devices with microprocessors or microcontrollers which are capable of networked communications. The client computing systems 106 may be communicatively coupled to the rest of the network 108 via wired, wireless or a combination of wired and wireless communications channels.

The network environment 100 includes a number of telecommunications devices 111 (only one illustrated). Such telecommunications devices 111 may, for example, take the form of Internet or Web enabled cellular phones (e.g., iPHONE®). The network environment 100 also includes a number of personal digital assistant (PDA) devices 112 (only one illustrated). Such PDA devices 112 may, for example, take the form of Internet or Web enabled PDAs or tablet computers (e.g., iPHONE®, iPAD®, TREO®, BLACKBERRY®), which may, for example, execute a set of browser instructions or program. The network environment 100 may include any number of a large variety of other devices that are capable of some type of networked communications. The telecommunications devices 110, PDA devices 112, as well as any other devices, may be communicatively coupled to the rest of the network 108 via wired, wireless or a combination of wired and wireless communications channels.

The one or more communications networks 108 may take a variety of forms. For instance, the communications networks 108 may include wired, wireless, optical, or a combination of wired, wireless and/or optical communications links. The one or more communications networks 108 may include public networks, private networks, unsecured networks, secured networks or combinations thereof. The one or more communications networks 108 may employ any one or more communications protocols, for example TCP/IP protocol, UDP protocols, IEEE 802.11 protocol, as well as other telecommunications or computer networking protocols. The one or more communications networks 108 may include what are traditionally referred to as computing networks and/or what are traditionally referred to as telecommunications networks or combinations thereof. In at least one embodiment, the one or more communications networks 108 includes the Internet, and in particular, the Worldwide Web (referred to herein as "the Web"). Consequently, in at least one embodiment, one or more of the server computing systems 102 execute server software to serve HTML source files or Web pages 114*a*-114*d* (collectively 114), and one or more client computing systems 106, telecommunications devices 110 and/or PDAs 112 execute browser software to request and display HTML source files or Web pages 114.

The network environment 100 includes an interactive system for electronically generating, placing, executing and/or tracking sports book wagers and sports book ticket sell back options and related transactions; determining refund amounts for bettors exercising sports book ticket sell back options; and/or receiving input regarding indications of sports book wagers and sports book ticket sell back options and related transactions. The interactive system may include one or more server computing systems 102, databases 104 and one or more client systems 106, telecommunications devices 111, and/or PDA devices 112.

The one or more server computing systems 102 execute instructions stored on non-transitory computer-readable storage media that cause the server computing systems 102 to electronically generate, place, execute and/or track sports book wagers and sports book ticket sell back options, and determine and issue refund amounts with respect to and/or between one or more client systems 106, telecommunications devices 111, and/or PDA devices 112, and provide communications during or in connection with such services to and between one or more client systems 106, telecommunications devices 111, and/or PDA devices 112.

Although not required, the embodiments will be described in the general context of computer-executable instructions, such as program application engines, objects, or macros stored on computer- or processor-readable storage media and executed by a computer or processor. Those skilled in the relevant art will appreciate that the illustrated embodiments as well as other embodiments can be practiced with other affiliated system configurations and/or other computing system configurations, including hand-held devices, multiprocessor systems, microprocessor-based or programmable consumer electronics, personal computers ("PCs"), network PCs, mini-computers, mainframe computers, and the like. The embodiments can be practiced in distributed computing environments where tasks or acts are performed by remote processing devices, which are linked through a communications network. In a distributed computing environment, program engines may be located in both local and remote memory storage devices.

Figure 2:
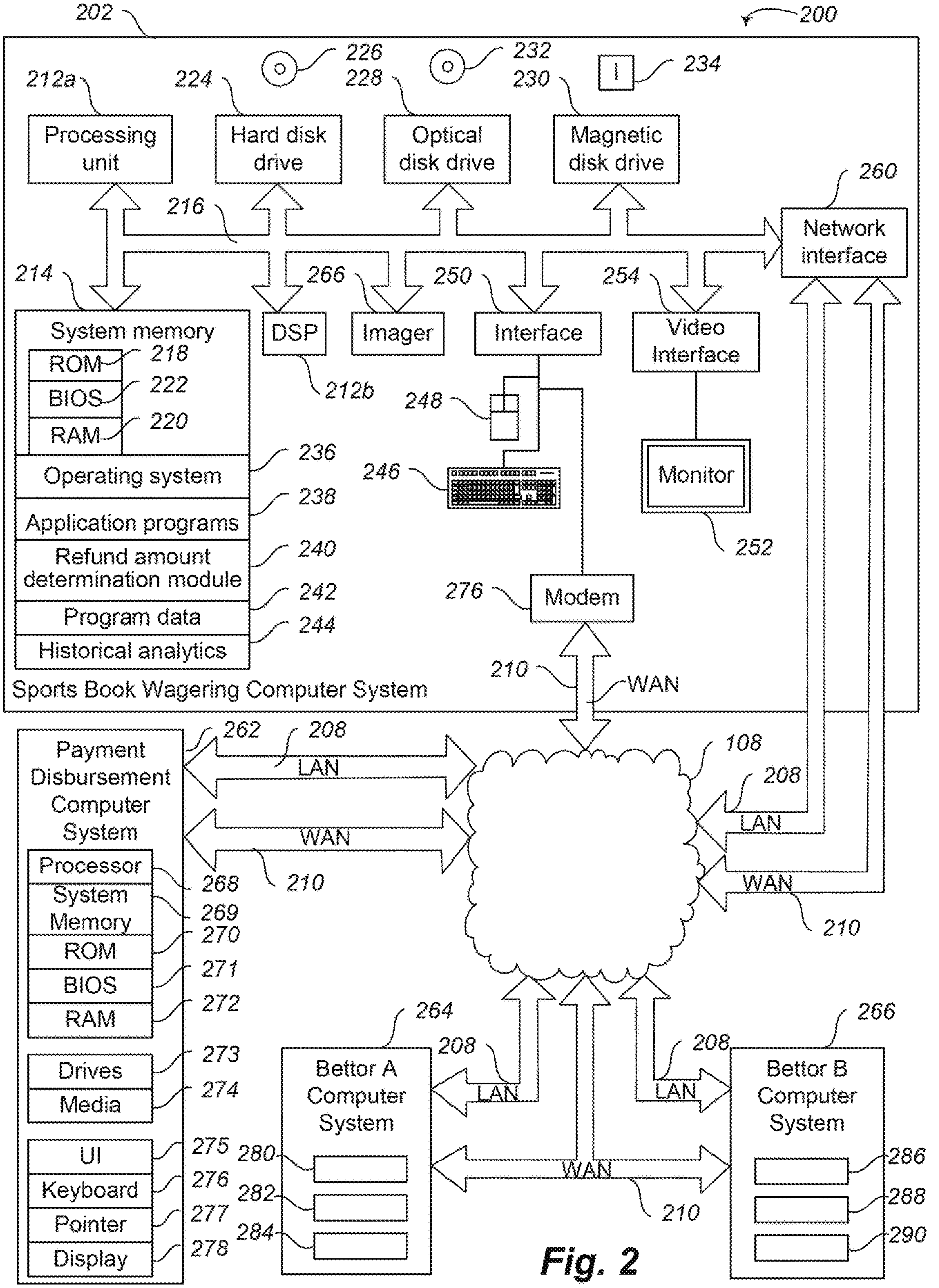
FIG. 2 is a schematic diagram of an electronic sports book wagering environment having example bettor computing systems, an example sports book wagering computer system, and an example payment disbursement computer system, according to one illustrated embodiment.

FIG. 2 shows an electronic sports book wagering environment 200 comprising a sports book wagering computer system 202, a payment disbursement computer system 262, example Bettor A computer system 264 and example Bettor B computer system 266, communicatively coupled by one or more communications channels, for example one or more local area networks (LANs) 208 or wide area networks (WANs) 210 that may be part of or connect to network 108. For example, the server computing systems 102 of FIG. 1 may include the sports book wagering computer system 202 and/or the payment disbursement computer system 262. Likewise, the number of client computing systems 106*a*-106*n* (collectively 106), telecommunications devices 111, and/or PDA devices 112 of FIG. 1 may include the example Bettor A computer system 264 and example Bettor B computer system 266. Communication between the computer systems shown in FIG. 2 may also be by transferring data on a non-transitory computer-readable medium, such as a disk, flash drive, other memory device, etc., that is readable by such computer systems.

The payment disbursement computer system 262 may include those computer systems of one or more various sports book entities of a casino or other licensed sports betting establishment. The example Bettor A computer system 264 and example Bettor B computer system 266 may include any user computer system having a Web browser on which Web sites, Web pages and/or Web applications are displayed or other sports book wagering or betting applications, such as those provided by a sports book of a casino or other licensed sports betting establishment, etc. Such Web sites, Web pages and/or Web applications may include those hosted and/or served by sports book wagering computer system 262, or those hosted and/or served by a Web server computer system accessible by the sports book wagering computer system 262, example Bettor A computer system 264, and example Bettor B computer system 266. For example, such a Web server computer system may be one or more of the server computing systems 102 of FIG. 1.

Sports book wagering computer system 202 may include those computer systems that electronically generate, place, execute and/or track sports book wagers and sports book ticket sell back options and related transactions; determine refund amounts for exercising sports book ticket sell back options; and/or receive input regarding indications of sports book wagers and sports book ticket sell back options and related transactions, stored in one or more databases or other computer-readable storage media. Sports book wagers may include wagers on any public event on which the sports book offers opportunities to bet, including, but not limited to: sporting events, horse racing, political events, competitions, contests, activities of public figures, activities of celebrities, etc. An "event" or a "sporting event" as used herein means any public event on which a sports book offers opportunities to bet. The sports book wagering computer system 202 may also provide a user interface to accept wagers from and sell sports book ticket sell back options to example Bettor A via example Bettor A computer system 264 and example Bettor B via example Bettor B computer system 266. For example, the user interface may be displayed as, within, or on Web pages served by the sports book wagering computer system 202, or as interfaces of other applications, including those various Web pages and Web sites of sports book operations, organizations, companies and individuals hosted and/or served by another Web server computer system or other computer system accessible via one or more local area networks (LANs) 208 or wide area networks (WANs) 210 that may be part of network 108.

The sports book wagering computer system 202 will at times be referred to in the singular herein, but this is not intended to limit the embodiments to a single device since, in typical embodiments, there may be more than one sports book wagering computer system or devices involved, or there may be multiple different computing systems that each store and/or serve different items (e.g., a Web server separate from a sports book wagering server or payment disbursement server, etc.) Unless described otherwise, the construction and operation of the various blocks shown in FIG. 2 are of conventional design. As a result, such blocks need not be described in further detail herein, as they will be understood by those skilled in the relevant art.

The sports book wagering computer system 202 may include one or more processing units 212*a*, 212*b* (collectively 212), a system memory 214 and a system bus 216 that couples various system components including the system memory 214 to the processing units 212. The processing units 212 may be any logic processing unit, such as one or more central processing units (CPUs) 212*a*, digital signal processors (DSPs) 212*b*, application-specific integrated circuits (ASICs), field programmable gate arrays (FPGAs), etc. The system bus 216 can employ any known bus structures or architectures, including a memory bus with memory controller, a peripheral bus, and a local bus. The system memory 214 includes read-only memory ("ROM") 218 and random access memory ("RAM") 220. A basic input/output system ("BIOS") 222, which can form part of the ROM 218, contains basic routines that help transfer information between elements within the sports book wagering computer system 202, such as during start-up.

The sports book wagering computer system 202 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a digital video disc ("DVD"), while the magnetic disk 234 can be a magnetic floppy disk or diskette, or other storage medium. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable storage media 226, 232, 234, may provide nonvolatile and non-transitory storage of computer-readable instructions, data structures, program engines and other data for the sports book wagering computer system 202. Although the depicted sports book wagering computer system 202 is illustrated employing a hard disk 224, optical disk 228 and magnetic disk 230, those skilled in the relevant art will appreciate that other types of computer-readable storage media that can store data accessible by a computer may be employed, such as magnetic cassettes, flash memory, compact discs ("CD"), Bernoulli cartridges, RAMs, ROMs, smart cards, solid state drives, etc.

The sports book wagering computer system 202 may include a network interface 260 operably coupled to the system bus 216. The network interface 260 may, for example, include one or more modems 252 and/or one or more Ethernet cards or other types of communications cards or components 254 for enabling communications via one or more local area networks (LANs) 208 or wide area networks (WANs) 210.

Program engines can be stored in the system memory 214, such as an operating system 236, one or more application programs 238, refund amount determination modules 240, program data 242 and historical analytics modules 244 capable of analyzing historical data of previous sporting events. Application programs 238 may include instructions that cause the processor(s) 212 to accept wagers from and sell sports ticket sell back options to Bettor A computer system 264, Bettor B computer system 266, and/or other bettor computer systems. Application programs 238 and refund amount determination modules 240 may include computer executable instructions and functionality to provide an interface to perform one or more of the following: place sports book wagers, exercise previously selected or purchased sports book sell back options, and determine refund amounts when bettors exercise previously selected or purchased sports book sell back options based on the analysis of historical data of previous sporting events by the historical analytics module. Application programs 238 and refund amount determination modules 240 may deliver such services over the LAN 208 or WAN 210 using one or more, or a combination of one or more network protocols including, but not limited to, hypertext transfer protocol (HTTP), TCP/IP protocol, UDP protocols, and IEEE 802.11 protocol, as well as other telecommunications or computer networking protocols.

Application programs 238 may also include instructions for handling security such as password or other access protection and communications encryption and also enable access and exchange data with sources such as corporate intranets, extranets, or other networks as described below, as well as other server applications on server computing systems such as those discussed further below. In particular, the system memory 214 may include historical analytics modules or programs, for example historical analytics module 244, configured to analyze and perform statistical analyses of previous sporting events with characteristics in common with the current sporting events on which wagers have been placed and for which sports book sell back options have been purchased. For example, these analyses may be based on historical data regarding outcomes of previous sporting events of the same type as the current sporting event at corresponding breaks in play or corresponding intervals in the previous sporting events and other corresponding factors at the corresponding breaks in play or corresponding intervals in the previous sporting events.

While shown in FIG. 2 as being stored in the system memory 214, the operating system 236, application programs 238, refund amount determination modules 240, program data 242 and historical analytics modules 244 can be stored on the hard disk 226 of the hard disk drive 224, the optical disk 232 of the optical disk drive 228 and/or the magnetic disk 234 of the magnetic disk drive 230.

An operator can enter commands and information into the sports book wagering computer system 202 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The sports book wagering computer system 202 can include other output devices, such as speakers, printers, etc.

The sports book wagering computer system 202 can operate in a networked environment using logical connections to one or more remote computers and/or devices as described above with reference to FIG. 1. For example, the sports book wagering computer system 202 can operate in a networked environment using logical connections to one or more payment disbursement computer systems 262, and to one or more bettor computer systems, for example, Bettor A computer system 264 and/or Bettor B computer system 266. Communications may be via a wired and/or wireless network architecture, for instance, wired and wireless enterprise-wide computer networks, intranets, extranets, and the Internet. Other embodiments may include other types of communications networks including telecommunications networks, cellular networks, paging networks, and other mobile networks.

The payment disbursement computer system 262 may be separate from or integrated with the sports book wagering computer system 202 and may take the form of a conventional mainframe computer, mini-computer, workstation computer, personal computer (desktop or laptop). The payment disbursement computer system 262 may include a processing unit 268, a system memory 269 and a system bus (not shown) that couples various system components including the system memory 269 to the processing unit 268. The payment disbursement computer system 262 will at times be referred to in the singular herein, but this is not intended to limit the embodiments to a single payment disbursement computer system 262 since in typical embodiments, there may be more than one payment disbursement computer system 262 or other device involved. Non-limiting examples of commercially available computer systems include, but are not limited to, an 80.times.86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 268 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks of the payment disbursement computer system 262 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269 includes read-only memory ("ROM") 270 and random access memory ("RAM") 272. A basic input/output system ("BIOS") 271, which can form part of the ROM 270, contains basic routines that help transfer information between elements within the peripheral computing system 114, such as during start-up.

The payment disbursement computer system 262 may also include one or more media drives 273 (e.g., a hard disk drive, magnetic disk drive, and/or optical disk drive) for reading from and writing to computer-readable storage media 274 (e.g., hard disk, optical disks, and/or magnetic disks). The computer-readable storage media 274 may, for example, take the form of removable media. For example, hard disks may take the form of Winchester drives, optical disks can take the form of DVDs, while magnetic disks can take the form of magnetic floppy disks or diskettes. The media drive(s) 273 communicate with the processing unit 268 via one or more system buses. The media drives 273 may include interfaces or controllers (not shown) coupled between such drives and the system bus, as is known by those skilled in the relevant art. The media drives 273, and their associated computer-readable storage media 274, provide nonvolatile storage of computer-readable instructions, data structures, program engines and other data for the payment disbursement computer system 262. Although described as employing computer-readable storage media 274 such as hard disks, optical disks and magnetic disks, those skilled in the relevant art will appreciate that payment disbursement computer system 262 may employ other types of computer-readable storage media that can store data accessible by a computer, such as magnetic cassettes, flash memory cards, compact discs ("CD"), Bernoulli cartridges, RAMs, ROMs, smart cards, solid state drives, etc.

Program engines, such as an operating system, one or more application programs, other programs or engines and program data, can be stored in the system memory 269. Program engines may include instructions for handling security such as password or other access protection and communications encryption. The system memory 269 may also include communications and server programs, for example a Web server that permits the payment disbursement computer system 262 to disburse and/or initiate disbursement of payments to bettors for winning bets and/or for refunds resulting from the bettor exercising a sports book ticket sell back option (e.g., during a specified break in play during an event or other indicated period). The other indicated period may be any period from the moment the wager is placed through completion of the entire sporting event or through completion of any portion of the sporting event. The payments may be disbursed directly via a cash dispenser or voucher printer (not shown) connected to or integrated with the payment disbursement computer system 262, or electronically to an account associated with the bettor. The electronic disbursements may be sent over the Internet and/or via Web applications and/or other networks or electronic payment and deposit systems such as automated clearing house (ACH) systems, credit, and debit systems, etc., via network 108.

While described as being stored in the system memory 269, the operating system, application programs, other programs/engines, program data and/or browser can be stored on the computer-readable storage media 274 of the media drive(s) 273. An operator can enter commands and information into the payment disbursement computer system 262 via a user interface 275 through input devices such as a touch screen or keyboard 276 and/or a pointing device 277 such as a mouse. Other input devices can include a microphone, joystick, game pad, tablet, scanner (e.g., sports book ticket scanner), etc. These and other input devices are connected to the processing unit 269 through an interface such as a serial port interface that couples to the system bus, although other interfaces such as a parallel port, a game port or a wireless interface or a universal serial bus ("USB") can be used. A display or monitor 278 may be coupled to the system bus via a video interface, such as a video adapter. The Payment disbursement computer system 262 can include other output devices, such as speakers, printers, etc.

The payment disbursement computer system 262 includes instructions stored in non-transitory computer-readable storage media that cause the processor(s) of the payment disbursement computer system 262 to pay bettors bets won that had been placed on sporting events through the sports book wagering computer system 202 from various bettor computer systems over the LAN 208 or WAN 210, including, for example, those from Bettor A computer system 264 and Bettor B computer system 266. For example, the sports book wagering computer system 202 may disburse or initiate disbursement of a ticket (paper or electronic) indicating a wager placed for a bet made on a sporting event by Better A.

The payment disbursement computer system 262 also includes instructions stored in non-transitory computer-readable storage media that cause the processor(s) of the payment disbursement computer system 262 to refund bettors amounts determined and communicated by the refund amount determination module 240 of the sports book wagering computer system 202 when the bettor exercises a previously purchased sports book ticket sell back option during a specified break in play or other indicated period of the sporting event on which the original bet was placed. The other indicated period may be any period from the moment the wager is placed through completion of the entire sporting event or through completion of any portion of the sporting event.

For example, Bettor A may have purchased on option to sell back the sports book ticket disbursed by the sports book wagering computer system 202 during half time of the sporting event on which the bet was made for a refund amount determined at the time the option is exercised. In some embodiments, this refund amount may not fall below a guaranteed pre-determined minimum amount. To exercise the purchased option, at some time (e.g., half time, between periods, between innings or quarters) during the sporting event, Bettor A sells back the sports book ticket issued by the sports book wagering computer system 202 by bringing, sending, initiating sending or otherwise communicating the ticket (if electronic) to the payment disbursement computer system 262 to have the ticket electronically scanned or read, have the refund amount determined (either by the sports book wagering computer system 202 or the payment distribution computer system) and receive the determined refund amount. In some embodiments, the payment distribution computer system may wirelessly authenticate the Bettor A computer system 264 (e.g., via a near field communications (NFC) or radio frequency identification (RFID) chip in the Bettor A computer system 264 and/or the payment distribution computer system 262) to enable payment disbursement to Bettor A. Note that although the refund amount determination module 240 and historical analytics module 244 are shown as being part of the sports book wagering computer system 202, one or both of these modules may also or instead be part of the payment disbursement computer system 262.

In instances where the refund amount determination module 240 is part of the payment disbursement computer system 262, the payment disbursement computer system 262 includes instructions stored in non-transitory computer-readable storage media that cause the processor(s) of the payment disbursement computer system 262 to receive additional information and analyses from the sports book wagering computer system 202 regarding historical statistical data of outcomes of previous sporting events of the same type as the current sporting event on which the bet was made and corresponding to the same breaks in play or corresponding intervals in the previous sporting events and other corresponding factors at the same breaks in play or corresponding intervals in the previous sporting events to determine a refund amount.

The Bettor A computer system 264 may have one or more identical or similar components to the previously described computer systems, for example a processing subsystem 280 including one or more non-transitory processor and computer-readable memories, a media subsystem including one or more drives and computer-readable storage media, and one or more user interface subsystems 282 including one or more keyboards, keypads, displays, pointing devices, graphical interfaces, scanners and/or printers.

The Bettor A computer system 264 includes program instructions stored in non-transitory computer-readable storage media such as those program instructions of a Web browser 284 configured to access the services of the sports book wagering computer system 202 and the payment disbursement computer system (e.g. to remotely place wagers on sporting events, purchase sports book ticket sell back options, remotely exercise previously purchased sports book ticket sell back options, collect refunds and payments, etc.). The browser 284 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft.

The Bettor B computer system 266 may have identical or similar components to the previously described computer systems, for example a processing subsystem 286 including one or more non-transitory processor and computer-readable memories, a media subsystem 288 including one or more drives and computer-readable storage media, and one or more user interface subsystems 290 including one or more keyboards, keypads, displays, pointing devices, graphical interfaces scanners and/or printers.

For example, the Bettor B computer system 266 may include program instructions stored in non-transitory computer-readable storage media such as those program instructions of a Web browser 290 configured to access the services of the sports book wagering computer system 202 similar to that of Web browser 284 of Bettor A computer system 264 described above. Although there are only two example bettor computer systems depicted in FIG. 2, there may be fewer or more such bettor computer systems operably connected to LAN 208 and/or WAN 210 in various other embodiments.

Figure 3:
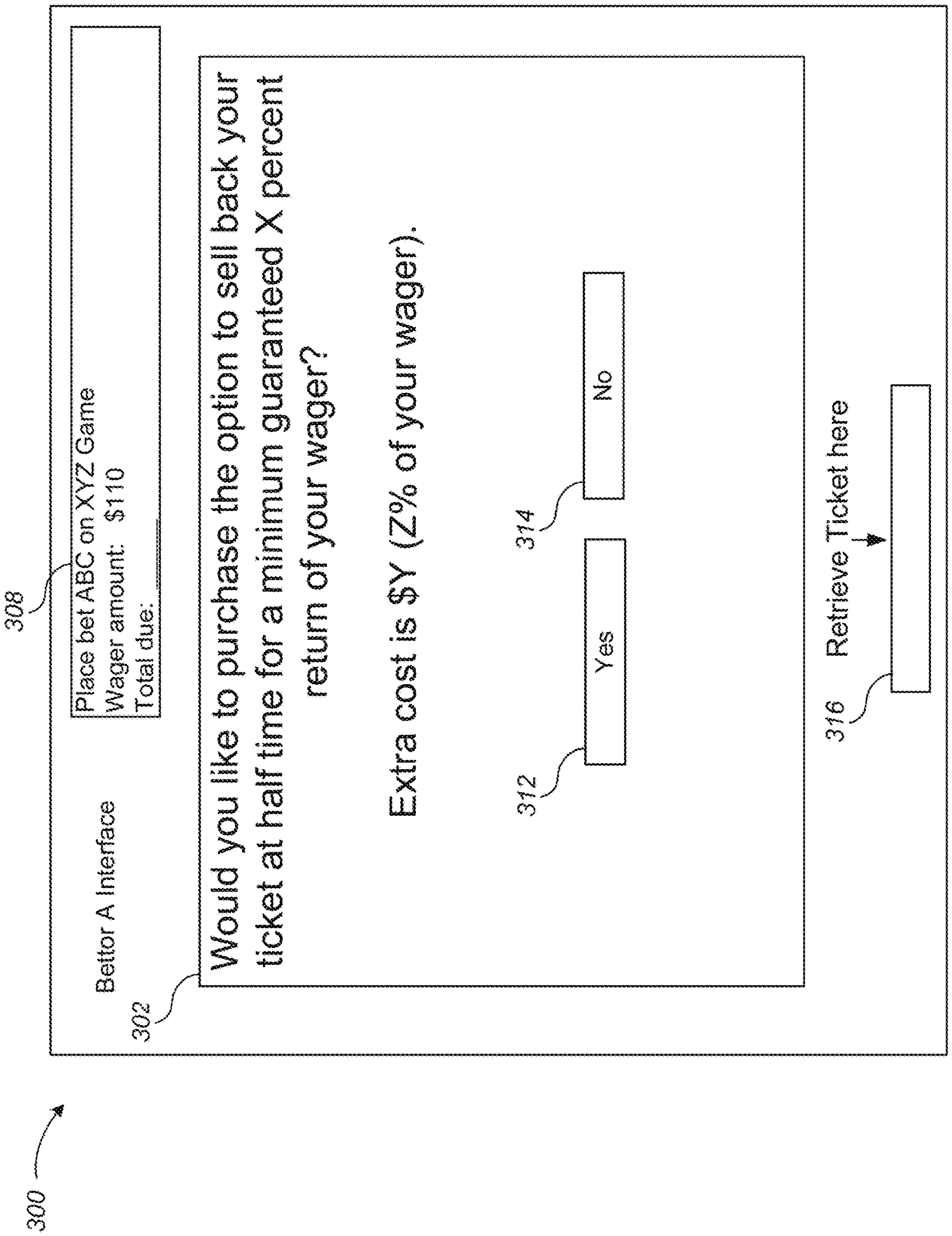
Fig. 3 PRIOR ART
FIG. 3 is a diagram of an example bettor user interface to purchase a sports book wager ticket sell back option, according to one illustrated embodiment.

FIG. 3 is a diagram of an example user interface 300 for Bettor A to purchase a sports book wager ticket sell back option, one or more portions of which may be displayed on a display of the sports book wagering computer system 202 or the Bettor A computer system 264, according to one illustrated embodiment. Bettor A may purchase a sports book ticket sell back option via the interface 300, for example, during the process of placing a wager on the corresponding sporting event. Also, a bettor may purchase a sports book ticket sell back option via the interface 300 after placing a wager on the corresponding sporting event at some time before completion of the specified break in play or indicated period in which the option may be exercised and after having received the sports book ticket indicating the initial wager. There may be some instances after which the sports book ticket has been issued where the purchase of a sell back option is barred or suspended, including, but not limited to: changes in the point spread, key players becoming injured, key players being removed from the roster, catastrophic events for a particular team, etc. The purchased option may be an option to be exercised by the bettor during a specified break in play or indicated period of the corresponding sporting event (e.g., during half time) for the bettor to receive compensation (i.e., a determined refund amount) for canceling the wager.

However, in some embodiments, all, or some of the user interface 300 features and components described herein may be configured for the sports book employee or agent to use instead of or in addition to Bettor A, such as to place wagers and make sell back option purchases on behalf of Bettor A. In other embodiments, neither the sports book nor Bettor A need use the Bettor A interface to place the wager and have the sell back option purchased by Bettor A. For example, Bettor A enters a sports book and walks up to the existing counter that is manned by an agent of the sports book. Bettor A then asks to make a wager on any of the types of bets for any of the events offered for wagering by the sports book (e.g., football, basketball, soccer, baseball, boxing, individual competitions, horse racing, political events, competitions, contests, activities of public figures, activities of celebrities, etc.). The types of bets or wagers may include, but are not limited to: straight, total score (i.e., over/under), money line, teasers, future bets, if-win only (single action), if-win-tie-cancel (double action), reverse wagers, buying points, proposition bets, etc. Bettor A then requests that the agent include the sell back option in his wager, or the agent makes a proffer to the bettor and the bettor accepts the proffer from the agent to participate in the sell back option. One or more of the above acts may be performed independently or in conjunction with the Bettor A interface. In one embodiment, where Bettor A declines purchase or selection of the sports book ticket sell back option (or had never been offered the sell back option) and after having been issued the sports book ticket indicating the initial wager, the sports book may make an unsolicited offer to Bettor A for Bettor A to have the opportunity to purchase a sports book ticket sell back option at some time before completion of the break in play or indicated period in which the option may be exercised. The offer to Bettor A may be displayed on a public display in the establishment of the sports book, shown on a display of the Bettor A computer system, printed out and provided to Bettor A, posted on a sports book web site, and/or electronically communicated via email, text message, fax, etc.

An added cost of participating in the sell back option, if any, is determined by the sports book and can range from 0% to any percentage of the ticket price or amount wagered and/or any fixed dollar amount chosen by the sports book. At the discretion of the sports book, an added cost of participating in the sell back option at the time the wager is placed may be higher or lower than an added cost of participating in the sell back option when purchased at a later time.

The refund amount (i.e., the value of the sports book ticket sell back option to Bettor A) may be determined at the time the sports book ticket sell back option is exercised based on a current probability or odds at the specified break in play of the event or indicated period of whether the bettor will win the bet for which the wager was made. The option may also include a minimum guaranteed amount (e.g., 20 percent of the wager amount, or other pre-determined minimum amount) to be refunded to the bettor should the bettor choose to exercise the option. However, in some embodiments, there may be no guaranteed percentage refund or other guaranteed refund amount. The current calculated refund amount (i.e., current value of the sports book ticket sell back option) may be shown to the bettor at the time of the purchase of the sports book ticket sell back option, or at any time from the moment the sporting event begins to (and including) the period when the bettor can exercise the option. For example, this value may be displayed on a public display in the establishment of the sports book, shown on the display 302 of Bettor A Interface, printed out and provided to the bettor, posted on a sports book web site, and/or electronically communicated via email, text message, fax, etc.

In one example embodiment, user interface item 308 of user interface 300 is configured to display an indication of the type of bet placed (e.g., ABC), display an indication of which sporting event on which the bet was placed (e.g., XYZ game) and the wager amount (e.g., $110). Before the ticket is issued, user interface item 302 is configured to display a prompt asking Bettor A whether the Bettor A would like to purchase the sports book ticket sell back option for a minimum guaranteed percent return of the wager amount should the option be exercised by the bettor during the specified break in play. In some embodiments, there may be no minimum guaranteed percentage refund or other guaranteed refund amount. The user interface item 302 also indicates the up-front and non-refundable cost or fee charged to the bettor for the purchase of the option. For example, this fee may be a percentage of the wager (e.g., 2.5 percent of the wager). However, other percentage amounts, flat fees, or combinations thereof, may be selectively charged by the sports book wagering computer system and will be indicated to the bettor via the user interface item 302. In some embodiments, the sports book may elect to charge no fee or a refundable fee for the purchase of a sports book ticket sell back option, and this will be indicated to the bettor via the user interface item 302.

The user interface item 302 also includes controls selectable by the bettor to indicate whether the bettor wants to purchase the sports book ticket sell back option. For example, the user selects icon or button 312 to indicate the bettor wants to purchase the option and selects icon or button 314 to indicate that the bettor does not want to purchase the option. In embodiments where user interface item 302 is displayed on the sports book wagering computer system 202, the interface 300 may also include a ticket printing and retrieval component 316 configured to print a sports book ticket indicating the wager and whether the sports book ticket sell back option had been purchased. These indications may be printed or otherwise encoded (e.g., on a bar code) on the sports book ticket dispensed by the ticket printing and retrieval component 316.

In other embodiments (e.g., those in which the user interface item 302 is displayed on a Bettor A computer system 264 remote from the sports book wagering computer system 202), the sports book ticket may be issued electronically as an electronic ticket stored on the sports book wagering computer system 202 and/or Bettor A computer system 264. The electronic sports book ticket is associated with the bettor via a code communicated to the bettor via the sports book wagering computer system, an account of the bettor, or other bettor credentials which may be verified at a point when the sports book ticket is used to redeem a payment amount for winning the bet placed or for exercising the purchased sports book ticket sell back option.

In embodiments where Bettor A declines purchase of a sports book ticket sell back option via the interface 300 after placing a wager on the corresponding sporting event at some time before completion of the specified break in play or indicated period in which the option may be exercised and after having been issued the sports book ticket indicating the initial wager, Bettor A may scan the sports book ticket (e.g., via a machine-readable symbol such as barcode or 2-D code symbol, radio frequency identification or RFID transponder, near field communication (NFC) chip, or optical character recognition or OCR) at a scanner that is part of the ticket printing and retrieval component 316 or located elsewhere (such as on the Bettor A computer system 264) to have the sell back option associated with the wager associated with the sports book ticket. In embodiments involving an electronic ticket, Bettor A may input the code provided to Bettor A at the time the ticket was issued, or other credentials associated with the electronic ticket or Bettor A in order to have the sell back option associated with the wager indicated by the previously issued sports book ticket.

Figure 4:
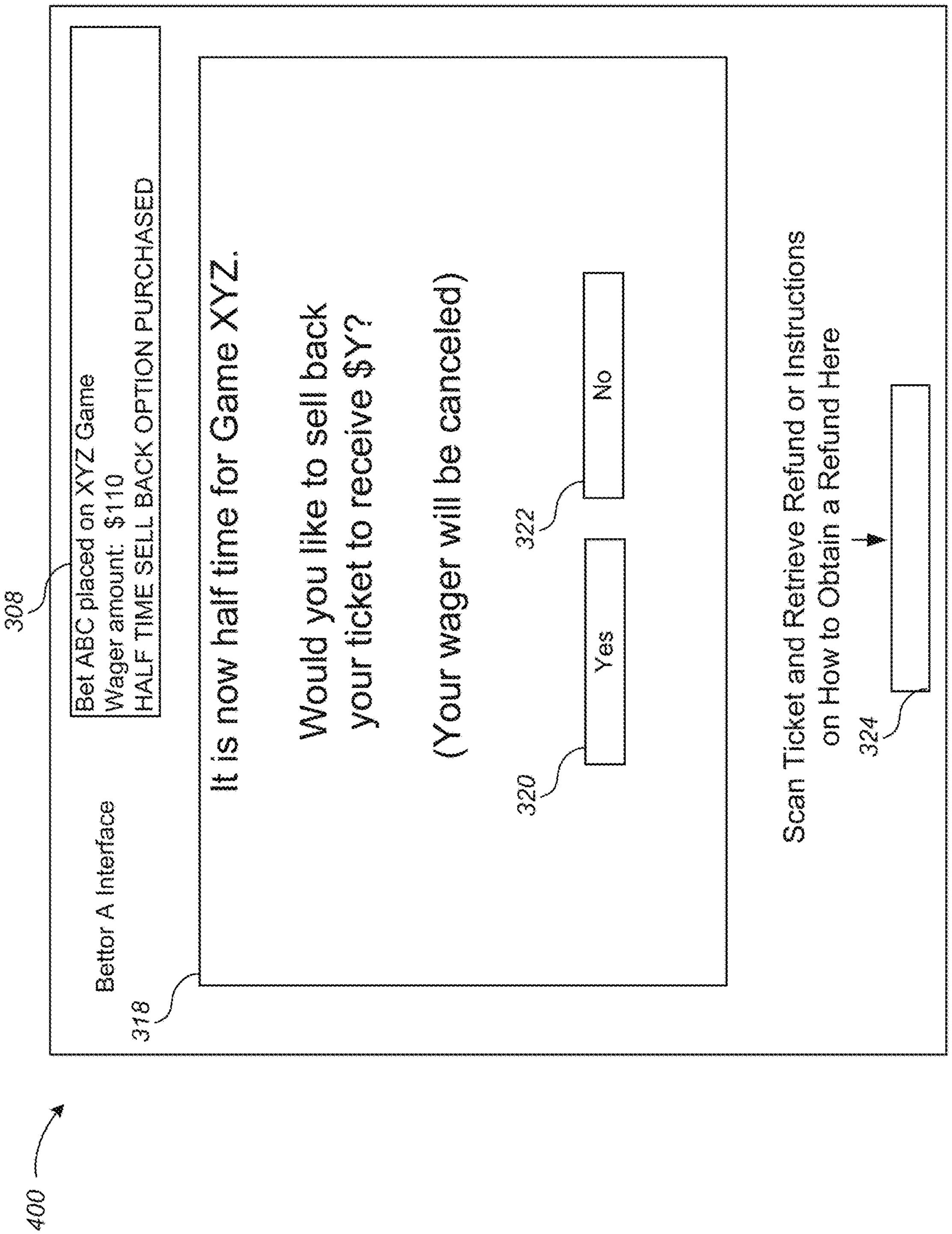
Fig. 4 PRIOR ART
FIG. 4 is a diagram of an example bettor user interface to exercise a sports book wager ticket sell back option, according to one illustrated embodiment.

FIG. 4 is a diagram of an example user interface 400 for facilitating Bettor A to exercise a sports book wager ticket sell back option, one or more portions of which may be displayed on a display of the sports book wagering computer system 202, payment disbursement computer system 262 or the Bettor A computer system 264, according to one illustrated embodiment. Bettor A may exercise a sports book ticket sell back option (such as the one purchased via interface 300 of FIG. 3) via the interface 400 of FIG. 4, for example, during the specified break in play or indicated period during which the previously purchased option is valid.

However, in some embodiments, all, or some of the user interface 400 features and components described herein may be configured for the sports book employee, cashier, or agent to use instead of or in addition to Bettor A, such as to exercise sell back option purchases on behalf of Bettor A and provide refunds to Bettor A. In other embodiments, neither the sports book nor Bettor A need use the user interface 400 to exercise the sports book ticket sell back option. For example, Bettor A may approach a sports book cashier, ask to exercise the sports book sell back option, hand the cashier the sports book ticket, and the cashier will provide the refund amount in cash to Bettor A. If Bettor A chooses to exercise the sports book ticket sell back option, Bettor A can make it known to the sports book via any system that the sports book cares to use, whether it be electronic or open utterance. For example, Bettor A can scan or insert the sports book ticket, or input information related to the sports book ticket, into an electronic kiosk, approach a sports book agent at the counter of the sports book or enter a code or scan the sports book ticket using an electronic handheld device, etc. However, with respect to Bettor A, such a kiosk, sports book agent and/or handheld device may use any combination of features and components described herein of the user interfaces 300 and 400, the sports book wagering system 202, payment disbursement computer system 262 and/or the Bettor A computer system to perform the sports book ticket sell back option purchase, exercise the sports book ticket sell back option, determine the sports book ticket refund amount and/or to disburse the refund amount.

The period in which the sports book ticket sell back option may be exercised may be during all or a portion of any number of periods during the sporting event as determined by the sports book. For example, sports book ticket sell back options may be exercised during a single specific break in play, multiple specific breaks in play or any break in play. A break in play is defined as stoppage in play for any reason whatsoever and may include, but is not limited to the following breaks in play during various sporting events: half time period, quarter periods, between innings or half-innings in baseball games, time-outs, between regulation time and overtime periods, during caution laps of an auto race, the period intermission of a hockey game, between rounds of a boxing match, prior to specific types of plays (e.g., field goals, two-point conversions, penalty kicks or shots), a period prior to a specific event that might occur during the course of play including but not limited to: an injury to a player, removal of a pitcher, or changing of a goaltender. In some embodiments, the sports book may determine that sports book ticket sell back options may be exercised from the moment the wager is recorded through completion of one of: a portion of the sporting event or the entirety of the sporting event. This is defined as an indicated period and may be communicated to the bettor at the time of placement of the wager. In one embodiment, sports book ticket sell back options may be exercised during both ongoing play as well as all breaks in play during the indicated period.

For example, during half time of a sporting event for which Bettor A has placed a wager and purchased a half time sports book ticket sell back option, Bettor A may approach the sports book wagering computer system 202, approach a cashier, employee or other agent using the sports book wagering computer system 202, or utilize the Bettor A computer system 264 to exercise the option. The bettor may scan their sports book ticket at the component 324 on the sports book wagering computer system 202 that is configured to scan and read information encoded in machine-readable symbols on or RFID transponders on or in the sports book ticket. Component 324 may then print out a voucher or coupon that the bettor may redeem for cash, or in some alternative embodiments, dispense cash. In other embodiments, instead of receiving a voucher or cash, the bettor may receive instructions at or via component 324 on how to obtain a refund. For example, component 324 may print, display, or otherwise communicate instructions for the bettor on how, when, and where to proceed to a cashier, refund machine, etc. with the ticket to complete the refund process. Component 324 may also communicate a refund code or other item to use alone or in conjunction with the ticket to enable the bettor to receive the refund or initiate an electronic transaction to credit an account of the bettor to provide the refund.

In some embodiments, where the sports book ticket is an electronic ticket, Bettor A may provide a code associated with the electronic ticket given to the Bettor at the time the ticket was issued, or input credentials associated with Bettor A and/or the issued electronic ticket at the sports book wagering computer system 202 or the Bettor A computer system 264. User Interface item 318 may then be displayed to Bettor A including a prompt asking Bettor A whether Bettor A would like to exercise the sports book ticket sell back option purchased for that sports book ticket. User Interface item 318 also displays the refund amount (i.e., the value of the sports book ticket sell back option to Bettor A). User interface item 308 of user interface 400 is also configured to display an indication of the type of bet placed (e.g., ABC), display an indication of which sporting event on which the bet was placed (e.g., XYZ game) and the wager amount (e.g., $110).

The user interface item 318 also includes controls (e.g., user selectable icons, dialog boxes, keys, switches, buttons) selectable by the bettor to indicate whether the bettor wants to exercise the sports book ticket sell back option. For example, the user selects icon or button 320 to indicate the bettor wants to exercise the option and selects icon or button 322 to indicate that the bettor does not want to exercise the option. If Bettor A selects icon or button 320 to indicate the Bettor A wants to exercise the option, then a refund amount will be dispensed, sent, or otherwise issued to Bettor A.

As mentioned above, the refund amount (i.e., the value of the sports book ticket sell back option to Bettor A) may be determined at the time the sports book ticket sell back option is exercised based on a current probability or odds at the specified break in play or indicated period of the sporting event of whether the bettor will win the bet for which the wager was made. The option may also include a minimum guaranteed amount (e.g., 20 percent of the wager amount, or other pre-determined minimum amount) to be refunded to the bettor should the bettor choose to exercise the option. However, in some embodiments, there may be no guaranteed percentage refund or other guaranteed refund amount. The current calculated refund amount (i.e., current value of the sports book ticket sell back option) may be shown to the bettor at the time of the purchase of the sports book ticket sell back option, or at any time from the moment the wager is placed to (and including) the period when the bettor can exercise the option. For example, this value may be displayed on a public display in the establishment of the sports book, shown on the display 318 of Bettor A Interface, printed out and provided to the bettor, posted on a sports book web site, and/or electronically communicated via email, text message, fax, etc. In some embodiments, Bettor A may approach and/or activate user interface 400 and scan or otherwise input the bettor's ticket or ticket information for the user interface 400 to display the current refund amount (i.e., the value of the sports book ticket sell back option to Bettor A).

The current refund amount (i.e., the value of the sports book ticket sell back option to Bettor A) can be determined in any manner that the sports book chooses. The sports book may use a historical probability model, a coin toss or whatever system or method they choose. In some circumstances, the sports book may choose to outsource determination of the current refund amount to an individual or entity deemed to have special expertise in the regard. Even when outsourced, the sports book retains ultimate authority to determine the current refund amount.

The determined refund amount may be based on statistical analyses of previous sporting events with characteristics in common with the current sporting events on which wagers have been placed and for which sports book sell back options have been purchased and, in some embodiments, based on intrinsic game factors. These intrinsic game factors may include, but are not limited to, catastrophic player injury, illness or other disqualification occurring before the specified break in play or before completion of the indicated period during which the sports book ticket sell back option may be exercised. In some embodiments, these analyses may be based on historical data regarding outcomes of previous sporting events of the same type as the current sporting event at corresponding breaks in play or corresponding intervals in the previous sporting events and other corresponding factors at the corresponding breaks in play or corresponding intervals in the previous sporting events.

For example, if Bettor A placed a wager of $110 on the Bears playing the Packers (the home team) that the Packers would not win by more than 7 points, and at half time the score is Bears 10 and Packers 17, then the analysis would determine the percentage probability (based on historical NFL statistical data) that a home team winning by 7 points at half time gains at least one point in the second half. The sports book wagering computer system 202 or payment disbursement computer system 262 would then use this probability to determine the amount to refund Bettor A at half time for exercising the sports book ticket sell back option. The percentage amount refunded may also be reduced further (e.g., by one percentage point) as an additional charge to the bettor and would thus increase the amount earned by the sports book organization (i.e., the vigorish). Using the present example, if the probability that a home team winning by 7 points at half time gains at least one point in the second half is 75 percent and the sports book organization reduces the percentage or odds paid to the bettor, e.g., by one percentage point, then the amount refunded Bettor A should Bettor A exercise the sell back option would be (25%-1%)*$210=$50.40. However, in other examples using the same wager amount, based on the probability and the additional percentage charged by the sports book organization, if the determined amount to refund falls below the guaranteed refund amount (e.g., falls below 20 percent of the wager amount), the amount refunded would instead be the guaranteed refund amount of 20 percent of the wager amount ($22).

In some embodiments, the determined amount to refund the bettor when the bettor exercises the sports book ticket sell back option may also be based on or adjusted according to the current number of sports book ticket sell back options being exercised for a particular winning or losing team during previous breaks in play and/or the current specified break in play or indicted period to keep a more even amount of sports book ticket sell back options being exercised for each team of the sporting event. For example, if the current number or dollar value of sell back options being exercised for team A of the sporting event far outweighs that of team B of the sporting event, then the determined amount to be refunded for exercising sports book ticket sell back options for team A may be reduced and/or the determined amount to be refunded for exercising sports book ticket sell back option for team B may be increased.

As described herein, bettors may cash out a wager in exchange for a cash out price (or refund amount) prior to an outcome of the wager (e.g., before the wager is determined to be a winning or losing wager). For example, a bet on a game outcome may be cashed out before the game ends. When a bettor cashes out a wager, the wager may be surrendered, cancelled, withdrawn, refunded, rendered invalid or unenforceable, voided, deleted, transferred to the bet counterparty (e.g., a counterparty who is required to pay a payout if the bet wins), or otherwise rendered so that a counterparty required to pay a payout on the bet if the bet is a winning bet no longer has to pay such payout. For purposes of illustration, examples of various embodiments herein may describe such cash outs in exchange for "cancelling" the wager. However, it should be appreciated that the bet need not be technically "cancelled," but instead may merely be surrendered or otherwise cashed out.

Although many embodiments are described herein wherein bettors pay for the option to sell back or cash out a bet, it should be appreciated that in some embodiments, there may be no charge to bettors for participating in the sell back option. For example, a bettor who makes a bet may be provided an opportunity to sell back the bet at a time before an outcome of the bet is determined, e.g., without charging (or having charged) the bettor for the opportunity to sell back the option.

In some embodiments, a user may cash out a wager prior to an outcome of the wager in exchange for a refund amount or cash out price that is determined based at least in part on (1) risk management information associated with a counterparty to the wager and/or (2) a current probability that the wager will be a winning wager and/or (3) a current market value of the wager (e.g., as priced in a market for exchanging wagers).

Risk management information may comprise information related to pending wagers associated with the counterparty to the wager (e.g., the wagers for and against an outcome that are accepted in a "book" by a "house," wherein the "house" is a counterparty to the wagers). In some embodiments, risk management information may comprise information about an imbalance between (1) potential proceeds from losing bets for a particular outcome and (2) potential payouts on winning bets for the particular outcome.

In some embodiments, the "house" may receive one or more bets on a particular outcome (e.g., that the Seahawks will beat the Patriots by 3.5 points) and one or more bets on one or more mutually exclusive outcomes (e.g., bets that the Seahawks will not beat the Patriots by 3.5 points, or equivalently that the Patriots will either beat the Seahawks or lose to the Seahawks by less than 3.5 points). These bets may be accepted by the "house". The bets on the event accepted by the "house" (e.g., the bets in favor of or against the Seahawks) may comprise the house's "book" for that particular event (e.g., Patriots vs Seahawks game). For bets on a game that one team will beat another team, the "book" of the "house" (e.g., counterparty to one or more bets made by users) may be considered "balanced" or "matched" if, for each betting outcome, the proceeds of losing bets would be sufficient to cover the payouts on winning bets. For example, the book may be balanced if there is an equal or substantially equal total volume of bets on one side of the bet (e.g., bets that the Patriots will win) as there are on the other side of the bet (e.g., bets that the Seahawks will either win or lose less than 3.5 points).

All other things being equal, the house may prefer that, for each possible betting outcome, the total potential payouts on one side of the bet (e.g., bets on the Seahawks) are offset by the total proceeds of wagers on the other side (e.g., bets on the Patriots). Thus, a "house" may prefer to keep their "books balanced," e.g., such that the total volume (or exposure) on one side of the bet is equal to (or approximately equal to) the total volume (or potential losing bet proceeds) of a contrary side of the bet. In the above example, to the extent that the total value of wagers on each side of the bet are equal, then regardless of the outcome of the bets, the funds received by the house on the losing wagers can be used to fund the payouts on the winning wagers. For example, all things being equal, the house may prefer that the total amount bet on the Patriots is equal (or approximately equal) to the total amount bet on the Seahawks. If a total of $100,000 is bet on the Seahawks and a total of $100,000 is bet on the Patriots, then the house should have no risk concerning the outcome of the bet: regardless of who wins, funds received from the losing wagers (e.g., $100,000) should be sufficient to pay the payouts on the winning wagers (e.g., $100,000). (Fees, commissions, spreads, differing odds, and other concepts have been ignored in this example for purposes of illustration.)

To the extent that losing bet proceeds in the event of a particular outcome would not be sufficient to pay out all winning bets on that outcome, the house (or other party liable for paying out the winning bets) may be considered to have exposure (or risk) for that outcome, and the party's "book" may be considered to be imbalanced. In some embodiments, risk management information may comprise information about such exposure, risk, and/or imbalance, e.g., as described herein.

In some embodiments, bet proceeds on the total bets on one outcome (e.g., bets that the Seahawks will win by at least 3.5) may be imbalanced with the bets on one or more mutually exclusive outcomes (e.g., bets that the Seahawks will not win by 3.5 points). In such cases where the total volume of bets received by a betting counterparty (e.g., house) on a particular outcome are different from a total volume of bets received by the counterparty for a mutually exclusive outcome, the total volume of bets for the counterparty may be determined to be "imbalanced" to the extent to which such amounts are not identical. E.g., ag house or other betting counterparty may be imbalanced if 90% of the volume of bets (accepted by the counterparty) are bets that outcome A will happen, and only 10% of the volume of bets (accepted by the counterparty) are bets on one or more outcomes wherein A does not happen.

In some embodiments, one or more bettors may be provided the opportunity to sell back an existing bet on an outcome while the bet is still pending (e.g., before the outcome can occur, such as before an end of a game for a bet on the game). For example, the "house" may offer various sellback prices to various bettors that would be paid to the bettors for selling back (or cancelling, withdrawing, etc.) their bets. The sell back price (e.g., price paid to a bettor in exchange for the bettor surrendering or selling back a bet, e.g., as described herein) may be determined based on risk management information. For example, the sellback amount may be determined based on one or more of (1) an imbalance between bets made against the house and bets made in favor of the house, and/or (2) a current market value of the bet (e.g., as determined based on prices offered to buy and sell the bet on a betting exchange), and/or (3) a probability that the bet will be a winning bet.

In some embodiments, the "house" or other entity may provide cash-out amounts to one or more users concerning one or more bets prior to the bets being determined to be winning or losing bets (e.g., prior to an outcome defined by the one or more bets). The cash out price may be calculated based on, e.g., (1) probability of success of the selected outcome and (2) any imbalance for the counterparty between bets placed in favor of the outcome and bets placed against the outcome (e.g., including or not including any bet that may have been placed otherwise).

In some embodiments, the "house" may price cash-out prices based at least in part on a current probability that the bet outcome will occur, a commission or other fee factor, and an imbalance between bets on one side of the bet (e.g., that the Patriots will win, and bets on another side of the bet (e.g., that the Seahawks will win).

For example, in some embodiments, there may be an imbalance between bets for and against a particular outcome (e.g., bets in favor of and against the Patriots beating the Seahawks in another context). For example, the imbalance may comprise $30,000.

In some embodiments, a cash-out price offered (e.g., and paid) to cash-out a bet may be determined based on an value determined based on a probability of success of the bet minus a fee and/or commission or spread (e.g., the price may be a calculated percentage of the wagered amount). In some embodiments, the amount paid to cash-out participants may comprise a calculated amount adjusted based on a factor associated with risk management (e.g., an amount associated with an extent to which the "house" has an imbalance between bets on this outcome and counter bets that are opposite to this this type of bet.

In some embodiments, in order to mitigate house risk on a particular betting outcome, the "house" may price its cash-outs on related bets (before the bet outcome occurs) in a way that is either more favorable or less favorable to a counterparty to the bet. For example, the "house" may have an unbalanced book if it accepted $50,000 total of bets that the Seahawks will win but only $10,000 total of bets that the Patriots will win. A bettor who bet on the Patriots may wish to cash out the bet prior to an end of the Patriots-Seahawks game, i.e., before the betting outcome is determined. In this case, the "house" holding all the bets may have an imbalance of betting volume on the outcome of the game, e.g., five times more volume on the Seahawks than on the Patriots. If the Seahawks win, the house may have to pay $50,000 to the winning bettors, but will only be holding $10,000 from the losing bettors. Accordingly, the house will have a net liability of $40,000 due to the imbalance of bets in its book. Before the end of the game, some bettors may wish to cash out their bet, e.g., by exercising an option to cash out the bet (e.g., as described herein). The cash out price offered to cash out bets on the Seahawks may be more favorable to the bettor, e.g., to encourage early cash-outs. To the extent bets on the Seahawks are cashed out before the end of the game, the house may reduce its potential net liability on the game's outcome. Stated another way, if the volume of cash outs for Seahawks bets is greater than the volume of cash outs for Patriots bets, then the $40,000 imbalance in the book will be reduced before the end of the game, resulting in a lower potential liability for the house by game end. For example, if $40,000 of betting volume on the Seahawks is cashed out prior to the game's outcome and none of the Patriots bets are cashed out, then by the end of the game the house will be holding $10,000 of bets on the Seahawks and $10,000 of bets on the Patriots, which at the time will be a balanced book. (It should be appreciated that the numbers provided here are simplified numbers for illustrating the concept, and these numbers ignore factors like different odds provided to different bets, house commissions, processing fees, etc.)

A more favorable price for cashing out a Seahawks bet before the end of the game (e.g., to reduce the imbalance in the house's book before game end) may be calculated a variety of ways. Ignoring the imbalance of bets, the "house" might otherwise be willing to cash out a Seahawks bet for 70% of its expected value. (Expected value may be calculated by multiplying a current probability that the bet will win by the payout on the bet if the bet wins; for example, if there is a 40% chance that a bet having a $10 payout will win, then the expected value of the bet may be $4.) However, because there is already more volume in favor of the Seahawks winning, the "house" may wish to encourage cash-outs of bets on the Seahawks, e.g., in the hopes that such pricing will tend to improve the overall balance of the bets in favor of and against a particular outcome by the time the outcome is determined. For example, the cash-out price for bets on the Seahawks may be more favorable to the bettor (e.g., 80% of expected value) than they would be if the book was balanced (e.g., with equal bet betting volume for and against the Patriots winning). Seahawk bets that cash out will tend to improve the balance of the book.

In some embodiments, cash out prices may be determined as follows. A current probability that the bet will be a winning bet may be determined. For example, based on a current score of a game at half-time (or other current event conditions), a current probability that the Seahawks will win can be determined. For example, if the Seahawks are up by 20 points (e.g., at half-time), an 80% probability may be calculated that the Seahawks will win by 3.5 points. Accordingly, an "expected value" of a $100 bet on the Seahawks may be calculated to be $80. One or more fees may be subtracted from the expected value, e.g., for house processing fees, risk fees, spreads for the house, and other fees. For example, a total of $10 may be subtracted from this value to cover a house fee. A price of $70 may be calculated as a cash out price, and $70 may be offered to cash out the Seahawks bet, e.g., if the book is balanced. If the book is imbalanced by a surplus of betting volume in favor of the Seahawks, an improved cash out price may be offered to cash out the bet on the Seahawks. For example, the cash out price may be increased by an amount such as $5, and thus a price of $75 (instead of $70) may be offered to cash out the $100 bet on the Seahawks during half-time. In some embodiments, the $10 fees may be reduced by an amount such as $5, also resulting in a cash out price of $75. If the bettor cashes out the $100 bet, the imbalance of Seahawks-Patriots bets will be slightly reduced. Cash out prices may be updated after one or more users cash out their bets, e.g., to reflect the changed book imbalance.

On the other hand, cashing out Patriot bets will tend to exacerbate the imbalance of the book. Accordingly, a less favorable cash-out price may be offered to bettors wishing to cash out bets where cashing out the bet would exacerbate a book imbalance (e.g., cashing out bets on the Patriots in the example above). For example, an expected value of a $100 bet on the Patriots may be calculated to be $20 during half-time based on a 20% chance of the Patriots winning. Fees of $10 may be subtracted from this price, resulting in a price of $10. Since cashing out the bet would tend to exacerbate the book imbalance, this price may be reduced by an amount such as $5, resulting in an offered cash out price of $5.

In some embodiments, the fees ($10 in the above examples) may be increased (to decrease the cash out price and thus discourage cash outs that would exacerbate the imbalance) or decreased (e.g., to improve the price and encourage cash outs that would improve the balance) based on the imbalance. For example, a percentage change in fees may be determined based on the extent of imbalance. If for a given bet outcome, total payouts (and/or other liabilities) would exceed losing bet proceeds (and/or other income) by certain threshold amounts, the fees may be reduced for balancing cashouts or increased (for imbalancing cash-outs) by various associated threshold amounts or percentages. For example, a percentage reduction in fees between 0% and 100% may be assigned to various imbalance amounts. For example, 0% may apply when the book is balanced, and a 100% reduction may apply when the book is imbalanced by $100,000 or more. The fees may be reduced by 1% for each $1000 of imbalance between $0 and $100,000. Relatedly, the fees may be increased by a percentage for imbalancing cash outs based on the current extent of imbalance. For example, the fees may be increased by 1% for each $1000 of imbalance. For example, a cashout fee of 6.4% may be applied if the current imbalance (potential liabilities exceeding losing bet proceeds) is $6,400. In the example above, the $10 fee for cashing out the $100 Patriots bet may be increased by 6.4% to $10.64, resulting in an offered cash out price of $9.36 for cashing out the $100 bet on the Patriots; and the $10 fee on the Seahawks bet may be reduced to $9.36, resulting in a cash out price of $70.64. Other methods of pricing cash outs based on risk may also be considered.

In some embodiments, the amount that may be added or subtracted from an initial price (e.g., to encourage or discourage cash outs) may be determined based on the extent of the imbalance. For example, the price difference may be based on the amount of risk exposure, e.g., measured in absolute terms (e.g., dollars of exposure) or relative terms (e.g., the percentage of bet volume for one outcome compared to the percentage of bets against that outcome).

In some embodiments, the risk management information may be updated over time, e.g., based on updated probability information and updated betting information (e.g., as bets are cashed out and the "imbalance" changes). Similarly, cash out prices may be updated over time to reflect the changed information. Thus, a cash out price offered to a bettor at one time may be different from a cash out price offered at another time.

It should be appreciated that the bets may comprise bets on any outcome of any event, e.g., in sports, political elections, and other events. For example, the bets may comprise a bet on the outcome of a specific inning or at-bat in a baseball game or the result of a particular down or ball possession during a football game. In such examples, an extent of an imbalance in a book of bets may be determined based on the extent to which the "house" entity can cover the potential payouts using bet proceeds of losing bets.

Figure 5:
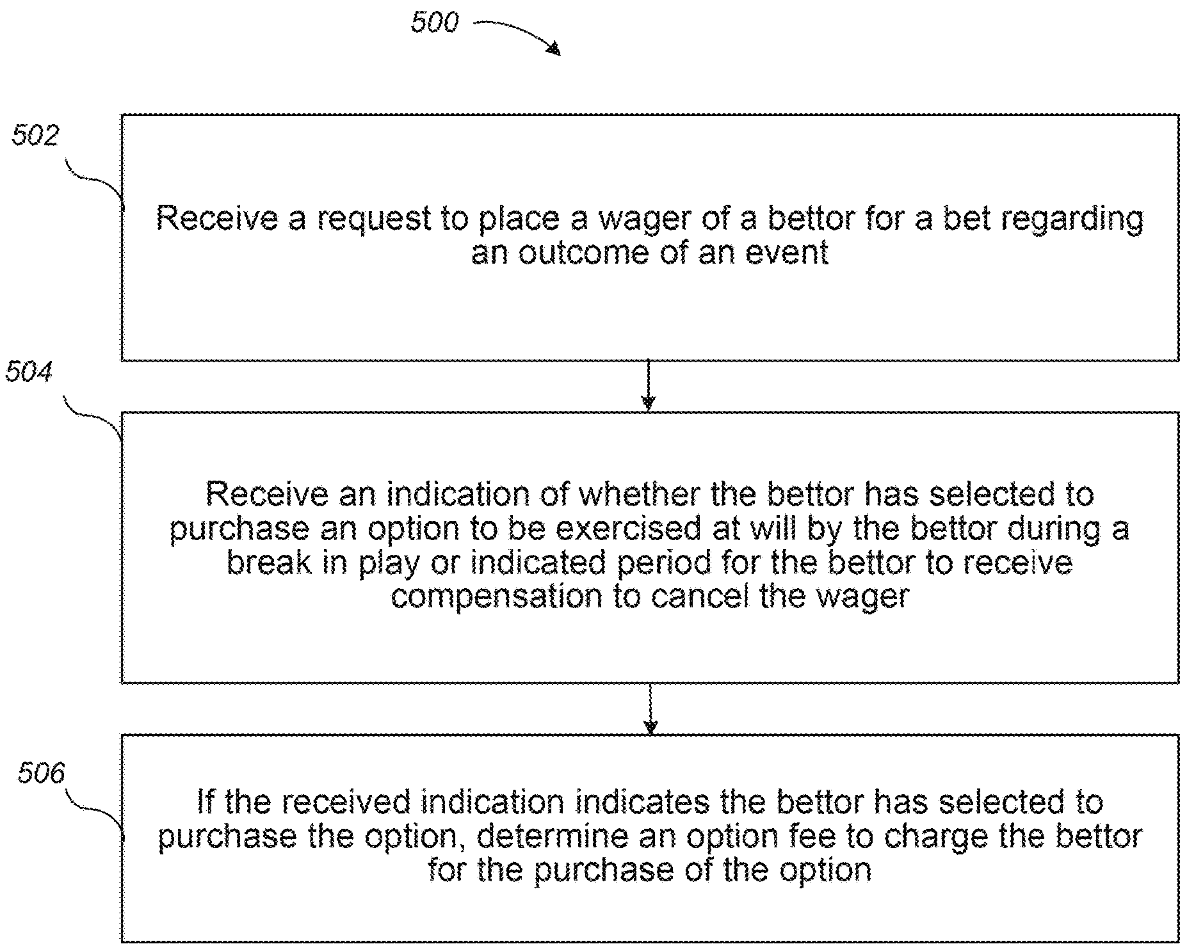
Fig. 5 PRIOR ART
FIG. 5 is a flow diagram showing a method of electronically processing a request to purchase a sports book wager ticket sell back option, according to one illustrated embodiment.

FIG. 5 shows a method 500 for electronically processing a request to purchase a sports book wager ticket sell back option, according to one illustrated embodiment. In some embodiments, the bettor may communicate the request for a wager in any manner to a designated agent of the sports book. The agent may then enter the wager into the sports book wagering computer system 202.

The method 500 starts at 502, in which the sports book wagering computer system 202 shown in FIG. 2 receives a request to place a wager of a bettor for a bet regarding an outcome of an event.

At 504, the sports book wagering computer system 202, receives an indication of whether the bettor has selected to purchase an option to be exercised at will by the bettor during a break in play or an indicated period for the bettor to receive compensation to cancel the wager.

At 506, if the received indication indicates the bettor has selected to purchase the option, the sports book wagering computer system 202 determines an option fee to charge the bettor for the purchase of the option.

Also, in some embodiments, a sports ticket sell back option may automatically be sold or included as part of the bet placed by the bettor, and the bettor automatically charged without prompting the bettor to indicate whether the bettor desires to purchase the sports book ticket sell back option.

Figure 6:
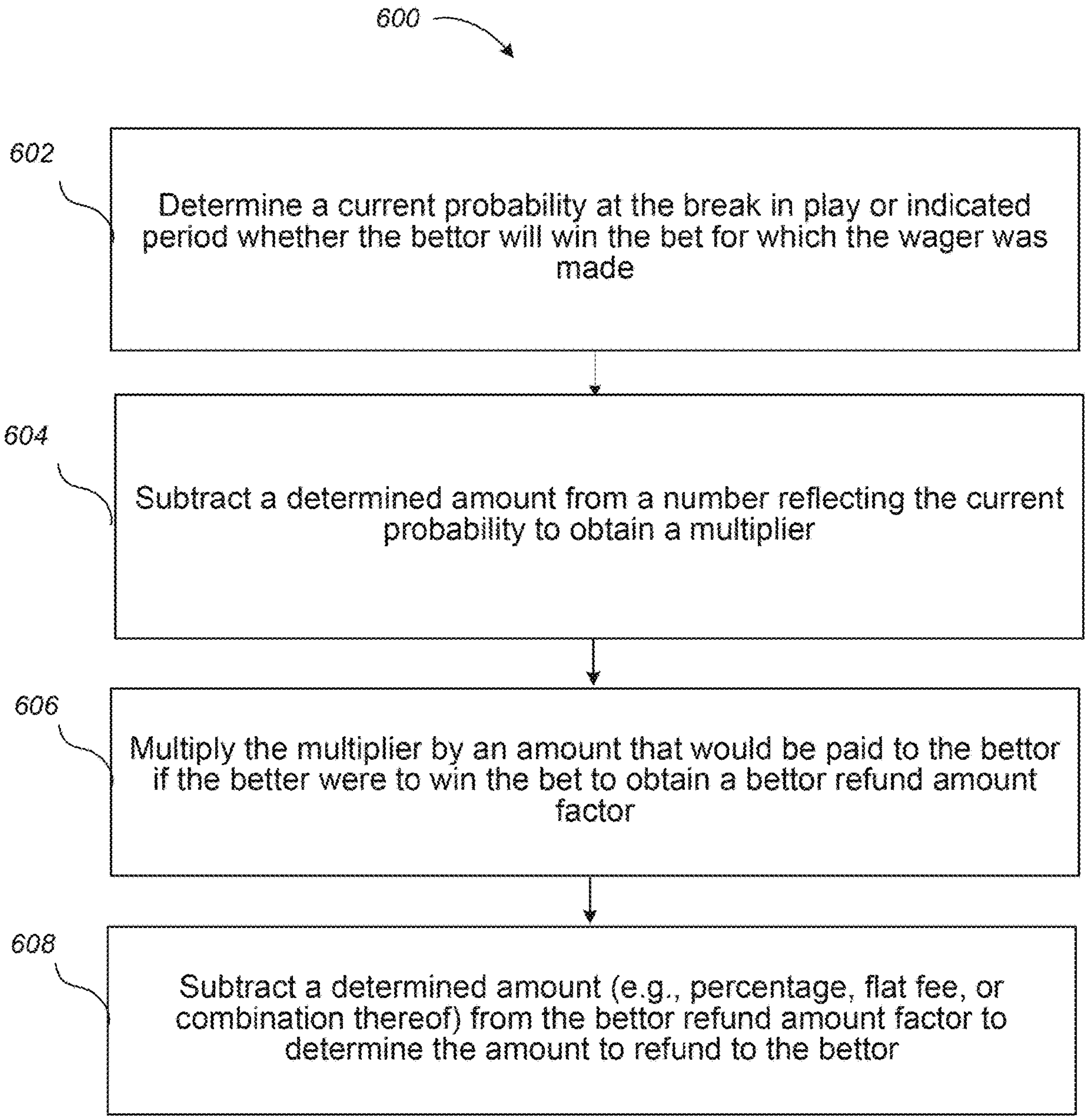
Fig. 6 PRIOR ART
FIG. 6 is a flow diagram showing a method of electronically determining an amount to refund a bettor who is exercising a sports book wager ticket sell back option previously purchased by the bettor that is useful in the method of FIG. 5, according to one illustrated embodiment.

FIG. 6 shows a method 600 for electronically determining an amount to refund a bettor who is exercising a sports book wager ticket sell back option previously purchased by the bettor that is useful in the method of FIG. 5, according to one illustrated embodiment. For example, during the specified break in play during the sporting event, or in some embodiments, during any time from the point the wager is placed until the sporting event ends, the sports book wagering computer system 202 may receive an indication that the bettor is exercising the purchased option and in response to the received indication that the bettor is exercising the purchased option, the sports book wagering computer system 202 determines an amount to refund to the bettor according to the method 600. Although the method 600 described below includes determining an amount to refund to the bettor based on a probability of whether the bettor will win the bet for which the wager was made, the amount to refund to the bettor may be based on anything. For example, the amount to refund to the bettor may be based on, including but not limited to: a probabilistic method, a random method, recommendation from an individual or entity, voting, a static amount, etc. In various embodiments, the amount to refund to the bettor may be any percentage of the original bet made by the bettor, a flat amount, or any combination thereof.

The method 600 starts at 602, in which the sports book wagering computer system 202 shown in FIG. 2 determines a current probability (e.g., percentage probability) at the break in play or the indicated period of whether the bettor will win the bet for which the wager was made.

At 604, the sports book wagering computer system 202 subtracts a determined amount (e.g., percentage, flat fee, or combination thereof) from a number reflecting the current probability (e.g., percentage probability) to obtain a multiplier.

At 606, the sports book wagering computer system 202 multiplies the multiplier by an amount that would be paid to the bettor if the better were to win the bet to obtain a bettor refund amount factor.

At 608 the sports book wagering computer system 202 subtracts a determined amount (e.g., percentage, flat fee, or combination thereof) from the bettor refund amount factor to determine the amount to refund to the bettor.

The method may further include varying the determined amount to refund to the bettor during the sporting event before the specified break in play or the indicated period, or at any time before the event on which the wager was placed ends, the varying of the determined amount being indicated by the electronic sports book wagering system.

The method may further include communicating the varied determined amount to the bettor in response to the varying of the determined amount.

For example, the method may include communicating the determined amount to the bettor at any point from a time ranging from the moment the wager is recorded to a point during the break in play or the indicated period during the sporting event. The receiving an indication that a bettor intends to exercise the option may include receiving the indication that the bettor intends to exercise the purchased option during the break in play or the indicated period during the sporting event.

The method may further include communicating the determined amount to the bettor in response to the received indication that the bettor intends to exercise the purchased option.

The up-front and non-refundable cost or fees charged to the bettor for the purchase of the sell back option as well as the fees charged at 604 and 608 are determined by the sports book. Such fees may vary depending, for example, on the individual sporting event, type of wager, or even from time to time (e.g., the day of the week the wager is placed and/or the day of the week the sporting event occurs). At the discretion of the sports book, some or all of the fees may be waived as a means of increasing current bettor's interest and attracting new bettors. In addition to the waiving of fees, the sports book may incentivize the purchase and/or redemption of sports book ticket sell back options by offering casino compensation ("comps") including but not limited to: free or discounted hotel room stays, show tickets, meals, drinks, gift certificates, etc.

Figure 7:
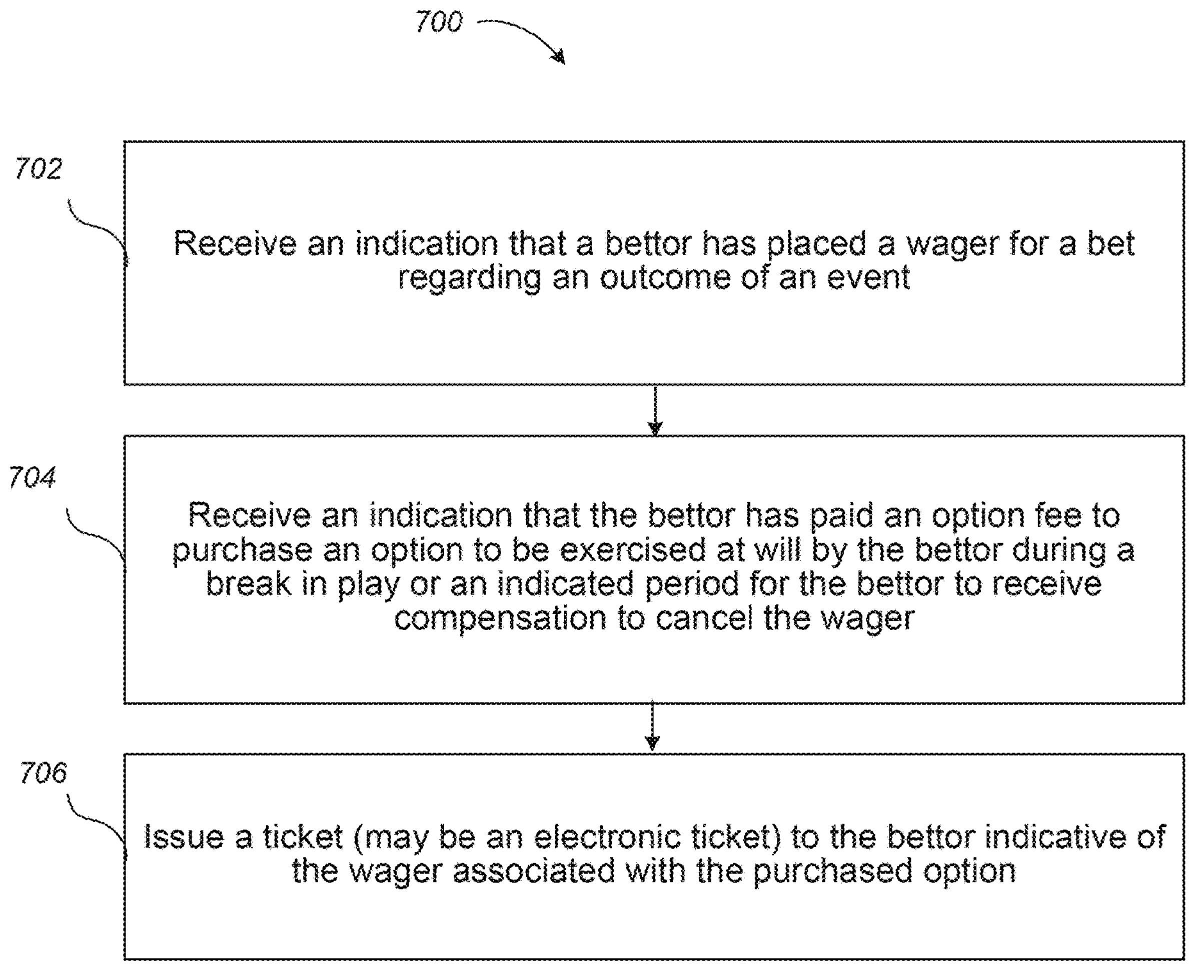
Fig. 7 PRIOR ART
FIG. 7 is a flow diagram showing a method of electronically issuing a ticket indicative of a wager associated with a sports book wager ticket sell back option, according to one illustrated embodiment.

FIG. 7 shows a method 700 for electronically issuing a ticket indicative of a wager associated with a sports book wager ticket sell back option, according to one illustrated embodiment.

The method 700 starts at 702, in which the sports book wagering computer system 202 shown in FIG. 2 receives an indication that a bettor has placed a wager for a bet regarding an outcome of an event.

At 704, the sports book wagering computer system 202 receives an indication that the bettor has paid an option fee to purchase an option to be exercised at will by the bettor during a break in play or an indicated period, for the bettor to receive compensation to cancel the wager.

At 706, the sports book wagering computer system 202 issues a ticket to the bettor indicative of the wager associated with the purchased option. As mentioned above the sports book ticket may be an electronic ticket that is issued electronically such as by providing a code to the bettor associated with the electronic ticket or associating the issued electronic ticket with a bettor account or other bettor credentials.

Figure 8:
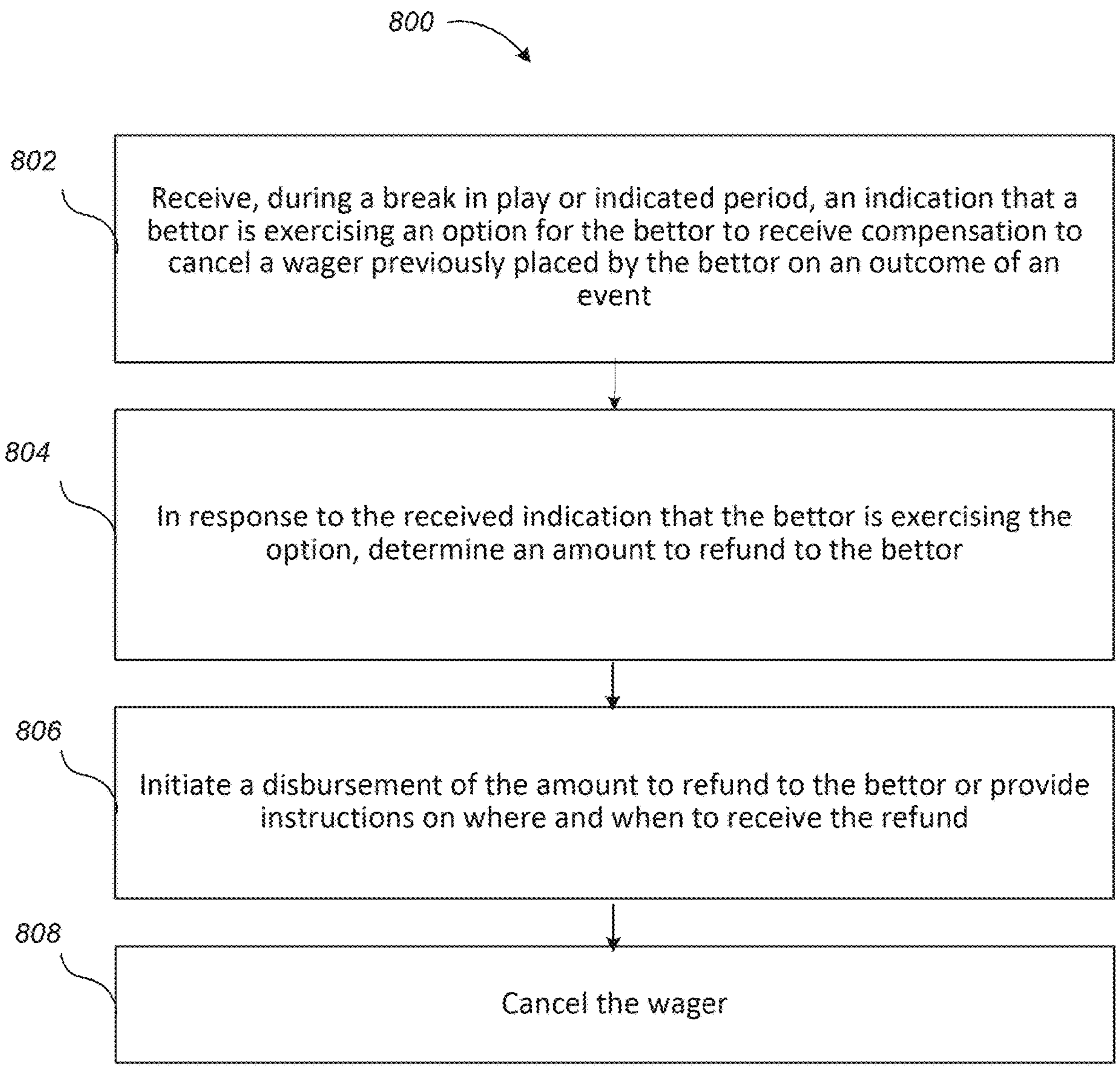
Fig. 8 PRIOR ART
FIG. 8 is a flow diagram showing a method of electronically initiating payment to a bettor who is exercising a sports book wager ticket sell back option previously purchased by the bettor, according to one illustrated embodiment.

FIG. 8 shows a method 800 for electronically initiating payment to a bettor who is exercising a sports book wager ticket sell back option previously purchased by the bettor, according to one illustrated embodiment.

The method 800 starts at 802, in which the sports book wagering computer system 202 or the payment disbursement computer system 262 shown in FIG. 2 receives, during a break in play or an indicated period, an indication that a bettor is exercising an option for the bettor to receive compensation to cancel a wager previously placed by the bettor on an outcome of an event.

At 804, the sports book wagering computer system 202 or the payment disbursement computer system 262, in response to the received indication that the bettor is exercising the option, determines an amount to refund to the bettor.

At 806, the sports book wagering computer system 202 or the payment disbursement computer system 262 initiates a disbursement of the amount to refund to the bettor. The refund to the bettor may be paid in currency or in the form of a credit or any item that has a value to the bettor, including casino compensation ("comps"), including, but not limited to: free or discounted hotel room stays, show tickets, meals, drinks, gift certificates, etc.

At 806, the sports book wagering computer system 202 or the payment disbursement computer system 262 then cancels the wager. For example, the wager may be removed from the sports book wagering computer system 202 or otherwise indicated by the sports book wagering computer system 202 as being canceled, invalid or no longer in effect.

Sell Back Option With Multiple Exercise Choices

According to another example of a sell back option, in connection with a bettor/patron/user placing/making a wager on an event for a wager amount W and/or subsequently thereto, a bettor may be presented with an opportunity to purchase an option to cancel/purge/sell back the wager in return/exchange for a refund/refund amount/refund payment/cancelation amount/cancelation payment of R. In connection with presenting the opportunity to purchase the option, the bettor also may be provided/presented with a plurality (e.g., two or more) of choices as to when the option may be exercised, or in other words, with a plurality of choices as to when the option may expire. For example, there may be four choices, although fewer or more choices may be presented. Hence, the bettor may have the choice to purchase the option with a first exercise time of X1, a second exercise time of X2, a third exercise time of X3, and/or a fourth exercise time of X4, or in other words, an option with an expiry of X1, X2, X3, and/or X4. According to this example, expiry/exercise time X4 may be subsequent to/after expiry/exercise time X3, expiry/exercise time X3 may be subsequent to/after expiry/exercise time X2, and expiry/exercise time X2 may be subsequent to/after expiry/exercise time X1. According to a further aspect of this example, regardless of which selection(s) of exercise/expiry time(s) the bettor may choose, the refund amount R may be the same. In addition, according to this example, each exercise time may have an associated price/cost/fee, such as exercise time X1 having a price P1, exercise time X2 having a price P2, exercise time X3 having a price P3, and exercise time X4 having a price P4. According to this example, one or more of prices P1, P2, P3, and P4 may be different and in particular, each of prices P1, P2, P3, and P4 may be different. According to one example, P1 may be less than P2, P2 may be less than P3, and P3 may be less than P4. In other words, a longer expiry time may have a larger price.

Hence, according to this example sell back option a bettor, in connection with placing/making a wager and/or subsequently thereto, may purchase an option to cancel/purge the wager in return for a refund amount R. In addition, the bettor may make a selection as to how much time the bettor would like to make the decision as to whether to cancel/purge the wager through the exercise of the option including, for example, up to and/or including an exercise time X1, up to and/or including a later exercise time X2, up to and/or including a still later exercise time X3, or up to and/or including a still later exercise time X4. According to this example, the more time the bettor would like, the higher the price the bettor may pay for the option. Again, each exercise time may have the same refund amount of R with the difference being that the bettor may pay more for additional time to make a decision.

As an example, a bettor may place a $100 wager on a football game, such as the Packers vs. the Bears. In connection with making/placing this wager and or subsequently thereto, the bettor may be presented the possibility of purchasing an option to purge/cancel the wager for a refund amount of 25% of the wager amount, or $25. In addition, the user may be presented with four expiry times, each with a different price:

Cost $2.50: The bettor may exercise the option at any time up to, and possibly including, the end of the first quarter (e.g., before the start of the second quarter) for a refund of $25.

Cost $5.50: The bettor may exercise the option at any time up to, and possibly including, the end of the second quarter (e.g., before the start of the third quarter) for a refund of $25.

Cost $9.00: The bettor may exercise the option at any time up to, and possibly including, the end of the third quarter (e.g., before the start of the fourth quarter) for a refund of $25.

Cost $12.50: The bettor may exercise the option at any time up to, and possibly including, the 2 minute warning in the fourth quarter (e.g., before the start of play after the 2 minute warning) for a refund of $25.

Hence, the bettor, if deciding to purchase the option, may select a desired expiry/exercise time for the option. The price of the option may be the price associated with the selected expiry/exercise time. Thereafter, the bettor may choose to exercise the option at any time up to and/or including, for example, the selected expiry/exercise time and receive in return the refund amount R, thereby canceling/purging the original wager. If the expiry time passes without the bettor exercising the option, the option expires, the bettor's wager remains in place/is not canceled, and the bettor either wins or loses the wager based on the outcome of the event wagered on.

One skilled in the art will recognize that rather than a bettor being presented with the possibility of purchasing an option and that option having a plurality of exercise times the bettor may select from, in connection with a bettor making/placing a wager and or subsequently thereto, the bettor may be presented the possibility of purchasing any one or more of a plurality of options to purge/cancel a wager. Here, each option may have the same refund amount R, but with each option having a progressively longer exercise time, and each option having a progressively larger price. Using the above example again where a bettor may place a $100 wager on a football game, such as the Packers vs. the Bears, the bettor may be presented the possibility of purchasing any one or more of four options to purge/cancel the wager for a refund amount of 25% of the wager amount, or $25:

Option 1: Cost $2.50—The bettor may exercise the option at any time up to, and possibly including, the end of the first quarter (e.g., before the start of the second quarter) for a refund of $25.

Option 2: Cost $5.50—The bettor may exercise the option at any time up to, and possibly including, the end of the second quarter (e.g., before the start of the third quarter) for a refund of $25.

Option 3: Cost $9.00—The bettor may exercise the option at any time up to, and possibly including, the end of the third quarter (e.g., before the start of the fourth quarter) for a refund of $25.

Option 4: Cost $12.50—The bettor may exercise the option at any time up to, and possibly including, the 2 minute warning in the fourth quarter (e.g., before the start of play after the 2 minute warning) for a refund of $25.

One skilled in the art will recognize that the above described characteristics of this example option are merely examples and that other variations are possible, including the application of the option to sports other than football and to events other than sports.

Turning to further example aspects of this example sell back option, the refund/cancelation amount R that a bettor may be offered in connection with each exercise/expiry time choice of a given option (and may subsequently receive upon exercising the option) may be a predetermined amount. In other words, at the time the offer to purchase the option is made to the bettor/at the time the bettor is contemplating the purchase of the option, the refund amount associated with each of the exercise/expiry times choices may be determined and may be conveyed to the bettor such that if the bettor were to purchase the option with a selected exercise time and later decide to exercise the option, the bettor may know the refund amount he/she will receive. The refund amount may be a guaranteed amount. In other words, the refund amount may be such that the bettor knows that if the bettor purchases the option and later decides to exercise the option, the bettor is guaranteed to receive the refund amount (e.g., exactly the determined refund amount or at least at a minimum, the determined refund amount).

The refund/cancelation amount R offered in connection with each exercise/expiry time choice of a given option may be determined in various fashions. For example, the refund amount R may be a set/constant amount, regardless of the wager made (e.g., regardless of the amount wagered, regardless of the amount/potential amount the bettor stands to win (i.e., the payout) on the wager associated with the option, etc.). For example, the refund amount associated with each of the exercise times associated with an offered option may be the same amount, and this amount may be the same for all bettors. A sports book, for example, may set the refund amount. As a further and/or additional example, the refund amount may vary depending on when the option is purchased by a bettor. For example, assuming the option may be purchased up to some set time (which may be some time before and/or including the start of an event, some set time into the event, etc.), the refund amount may vary depending on when the option is purchased relative to that set time. For example, assuming the option may be purchased up to one minute before the start of an event wagered on (set time), the refund amount may be a first amount if the option is purchased any time up to one day prior to that set time, and may be a second amount if purchased any time thereafter up to the set time. The refund amount may decrease the closer to the set time the option is purchased. Alternatively, the refund amount may increase the closer to the set time the option is purchased. The refund amount may change at preset times (which may or may not be made known to the bettor) as the set time approaches, e.g.: one week before, one day before, twelve hours before, one hour before, etc. As another and/or additional example, for a given sporting event for example, say football, the refund amount(s) may be the same amount for every game on a given day, or may be different across one or more of the games played on that day (e.g., every bettor that wagers on game A and exercises an associated option may receive refund amount R1 and every bettor that wagers on game B and exercises an associated option may receive a different refund amount R2). As another and/or additional example, the refund amount(s) may be the same across different sporting events for example, say football and baseball, and/or may be different across one or more different sporting events. Other variations are possible.

According to another and/or additional example, the refund amount R may be determined as a function of the wager amount W of the wager associated with the option. For example, the refund amount may be a predetermined percentage of the wager amount W. A sports book, for example, may set the percentage. For example, if a bettor wagers $100 on an event and the predetermined percentage is 25%, upon exercising the option the bettor may receive $25 ($100×25%) regardless of the exercise time the bettor selects (i.e., the refund amount associated with each exercise time of the option offered to the bettor may be $25). The predetermined percentage may vary depending on when the option is purchased. For example, assuming the option may be purchased up to some set time, the percentage may vary depending on when the option is purchased relative to that set time. For example, assuming the option may be purchased up to one minute before the start of an event wagered on, the percentage may be a first amount if the option is purchased any time up to one day prior to that set time, and may be a second amount if purchased any time thereafter up to the set time. The percentage may decrease the closer to the set time the option is purchased. Alternatively, the percentage may increase the closer to the set time the option is purchased. The percentage may change at preset times (which may or may not be made known to the bettor) as the set time approaches, e.g., one week before, one day before, twelve hours before, one hour before, etc. As another and/or additional example, the percentage may vary depending on the size of the wager amount W. For example, the percentage may decrease the larger the wager amount. Alternatively, the percentage may increase the larger the wager amount. As an example, wager amounts may be classified into ranges with a percentage associated with each range. As another and/or additional example, the percentage may vary according to the payout/potential-estimated payout a bettor stands to win on the wager associated with the option. For example, the percentage may decrease the larger the payout. Alternatively, the percentage may increase the larger the payout. As an example, payouts may be classified into ranges, with a percentage associated with each range. As another and/or additional example, for a given sporting event for example, say football, the percentage(s) may be the same for every game on a given day, or may be different across one or more of the games played on that day. As another and/or additional example, the percentage(s) may be the same across different sporting events, for example say football and baseball, and/or may be different across one or more different sporting events. Other variations are possible.

As another and/or additional example of the refund amount R being determined as a function of the wager amount W, wager amounts may be broken into ranges with each range having an associated refund amount. For example, the refund amount may generally decrease the larger the wager amount. Alternatively, the refund amount may generally increase the larger the wager amount. As another and/or additional example, the refund amount for one or more of the ranges may vary depending on when the option is purchased. For example, assuming the option may be purchased up to some set time, the refund amount for one or more of the ranges may vary depending on when the option is purchased relative to that set time. In general, the refund amounts across the ranges may decrease the closer to the set time the option is purchased. Alternatively, the refund amounts across the ranges may increase the closer to the set time the option is purchased. The refund amounts across the ranges may change at preset times (which may or may not be made known to the bettor) as the set time approaches, e.g., one week before, one day before, twelve hours before, one hour before, etc. As another and/or additional example, for a given sporting event for example, say football, the ranges and/or refund amount(s) across the ranges may be the same amount for every game on a given day, or may be different across one or more of the games played that day. As another and/or additional example, the ranges and/or refund amounts across the ranges may be the same across different sporting events, for example say football and baseball, and/or may be different across one or more different sporting events. Other variations are possible.

Refund amounts may be determined as a function of wager amounts in other fashions than those discussed herein. As a further and/or additional example, for wager amounts of a specified size/amount or larger, the sell back option may not be made available to a bettor. As another example, the sell back option may not be made available to a bettor unless the wager amount is of a minimum size/amount. A sports book for example, my specify the wager amount to which the option is available/not available. As a still further and/or addition example, the wager amount used to determine the refund amount may have a ceiling. In other words, when a bettor wagers an amount greater than a specified ceiling amount, the wager amount used to determine the refund amount may be set at the ceiling amount. For example, assuming the refund amount may be a predetermined percentage of the wager amount W, say 25%, and that the ceiling amount is $100, if a bettor wagers $110, the refund amount may be set at 25% of the ceiling amount of $100 (i.e., $25) rather than 25% of $110. A sports book for example, my specify the ceiling amount. Other variations are possible.

According to another and/or additional example, the refund amount may be determined as a function of the payout/potential-estimated payout a bettor stands to win on the wager associated with the option. For example, the refund amount may be a predetermined percentage of the payout/potential payout. A sports book, for example, may set the percentage. For example, if a bettor stands to win $100 on a bet and the predetermined percentage is 25%, upon exercising the option the bettor may receive $25 ($100×25%) regardless of the exercise time the bettor selects (i.e., the refund amount associated with each exercise time of the option offered to the bettor may be $25). As similarly discussed above, the predetermined percentage may vary depending on when the option is purchased. For example, the percentage may decrease the closer to the set time the option is purchased. Alternatively, the percentage may increase the closer to the set time the option is purchased. The percentage may change at preset times (which may or may not be made known to the bettor) as the set time approaches, e.g., one week before, one day before, twelve hours before, one hour before, etc. As another and/or additional example, the percentage may vary depending on the size of the payout/potential payout. For example, the percentage may decrease the larger the payout/potential payout. Alternatively, the percentage may increase the larger the payout/potential payout. As an example, payout/potential payouts may be classified into ranges with a percentage associated with each range. As another and/or additional example, the percentage may vary according to the wager amount. For example, the percentage may decrease the larger the wager amount. Alternatively, the percentage may increase the larger the wager amount. As an example, wager amounts may be classified into ranges, with a percentage associated with each range. As another and/or additional example, for a given sporting event for example, say football, the percentage(s) may be the same for every game on a given day, or may be different across one or more of the games played on that day. As another and/or additional example, the percentage(s) may be the same across different sporting events, for example say football and baseball, and/or may be different across one or more different sporting events. Other variations are possible.

As another and/or additional example of the refund amount R being determined as a function of the of the payout/potential payout, payouts/potential payouts may be broken into ranges with each range having an associated refund amount. For example, the refund amount may generally decrease the larger the payout/potential payout. Alternatively, the refund amount may generally increase the larger the payout/potential payout. As another and/or additional example, the refund amount for one or more of the ranges may vary depending on when the option is purchased. For example, the refund amounts across the ranges may decrease the closer to the set time the option is purchased. Alternatively, the refund amounts across the ranges may increase the closer to the set time the option is purchased. The refund amounts across the ranges may change at preset times (which may or may not be made known to the bettor) as the set time approaches, e.g., one week before, one day before, twelve hours before, one hour before, etc. As another and/or additional example, for a given sporting event for example, say football, the ranges and/or refund amounts across the ranges may be the same amount for every game on a given day, or may be different across one or more of the games played on that day. As another and/or additional example, the ranges and/or refund amounts across the ranges may be the same across different sporting events, for example say football and baseball, and/or may be different across one or more different sporting events. Other variations are possible.

Refund amounts may be determined as a function of payouts/potential payouts in other fashions than those discussed herein. As a further and/or addition example, for payouts/potential payouts of a specified size or larger, the sell back option may not be made available to a bettor. A sports book for example, my specify the payouts/potential payouts to which the option is available/not available. As a still further and/or addition example, the payouts/potential payouts used to determine the refund amount may have a ceiling. In other words, when a payout/potential payout is greater than a specified ceiling amount, the payout/potential payout used to determine the refund amount may be set at the ceiling amount. A sports book for example, my specify the ceiling amount. Other variations are possible.

Turning to further example aspects of this example sell back option, the price associated with each exercise time may be a set/constant amount, regardless of the wager made/amount wagered and/or regardless of a payout/potential-estimated payout a bettor may stand to win. Hence, each bettor may be presented with the same price(s). A sports book, for example, may set the price(s). According to another and/or additional example, one or more of the prices may be determined as a function of the wager amount W of the wager associated with the option. As a still further and/or addition example, the wager amount used to determine the price(s) may have a ceiling. In other words, when a bettor wagers an amount greater than a specified ceiling amount, the wager amount used to determine the price(s) may be set at the ceiling amount. According to another and/or additional example, one or more of the prices may be determined as a function of the payout/potential-estimated payout a bettor stands to win on the wager associated with the option. As a still further and/or addition example, the payouts/potential payouts used to determine the price(s) may have a ceiling. In other words, when a payout/potential payout is greater than a specified ceiling amount, the payout/potential payout used to determine the price(s) may be set at the ceiling amount. As a further and/or additional example, one or more of the prices may vary depending on when the option is purchased by a bettor. For example, one or more of the prices may decrease the closer to a set time the option is purchased. Alternatively, one or more of the prices may increase the closer to the set time the option is purchased. As another and/or additional example, for a given sporting event for example, say football, one or more of the prices may be the same amount for every game on a given day, or may be different across one or more of the games played on that day). As another and/or additional example, one or more of the prices may be the same across different sporting events for example, say football and baseball, and/or may be different across one or more different sporting events. Other variations are possible.

Turning to further example aspects of this example sell back option, the choices of exercise/expiry times that a bettor may be offered in connection with a given option may be defined in various fashions. For example, one or more of the exercise times associated with a given option may be:

- one or more specific times of day, such a 12 noon, 1 PM, etc.;
- one or more specified amounts of time into a sporting event, such as 15 minutes into an event, 30 minutes into the event, etc.;
- one or more specified times during an event such as end of one or more quarters in football, end of one or more innings or half innings in baseball, one or more times in a hockey event including intermission, end of one or more rounds in boxing, one or more furlongs in a horse race, completion of one or more laps by a lead car, e.g., in auto racing, etc.; and/or
- one or more occurrences of a specific event within a sporting event such as, the occurrence of the first field goal, the occurrence of the nth field goal, the occurrence of a team scoring, the occurrence of the first team to score z points, etc.

One skilled in the art will recognize that other variations of exercise/expiry times are possible including any variations of the above. For example, one or more of the exercise/expiry times offered in connection with an option may be a specific time of day and another may be a specified time during an event such as end of a quarter in football. As another example, one or more of the exercise/expiry times offered in connection with an option may be before the start of an event and/or during the event.

According to further example aspects of this example sell back option, the option may be offered to a bettor in connection with the bettor placing/making a wager on an event and/or subsequently thereto. In either instance, the bettor may be required to purchase the option when offered, or may be given the opportunity to purchase the option at a later time. According to one example, there may be a set time when the option is no longer available for purchase. As discussed herein, for example, the option may be available for purchase up to some set time before and/or including the start of an event, some set time into the event, etc. The option may be available for purchase up to some set time before the first exercise/expiry time offered in connection with option. For example, referring to the example option discussed herein offered in connection with the Packers vs. the Bears, the option may be available for purchase up to some set time before the end of the first quarter or in other words, some set time before the exercise/expiry time that costs $2.50.

According to another and/or additional example, the number of choices of exercise/expiry times offered to a bettor may change depending on when the offer to purchase the option is made to a bettor and/or when a bettor decides to purchase the option. For example, referring again to the example option discussed herein offered in connection with the Packers vs. the Bears, when a bettor places a wager on the game, the bettor may be offered the possibility to purchase the option along with selecting any one of the four exercise/expiry times. Assuming the bettor declines to purchase the option at that time, but then later decides he/she would like to purchase the option, one, two, or three of the choices of exercise/expiry times may no longer be available. For example, the bettor may no longer have the choice of selecting the exercise/expiry time that costs $2.50. This may occur for example, if the end of the first quarter is too close to and/or has already occurred at the time the bettor decides to purchase the option. As another example, assuming a first bettor places a wager on the game at one time and a second bettor places a wager on the game at later second time, the second bettor may be offered a fewer selection of exercise/expiry times than the first bettor. For example, the first bettor may be offered all four choices, while the second bettor may be offered three, two, or just one of the choices. This may occur for example, if the first bettor places a wager well before the start of the game and the second bettor places a wager after the start of the game, such as to close to and/or after the first quarter. Other variations are possible.

According to further example aspects of this example sell back option, once a bettor has selected an exercise/expiry time and purchased the option, there may be designated points (e.g., discrete points) during the period of time leading up to the selected exercise time at which the bettor may exercise the option. For example, the bettor may be allowed to exercise an option only between plays, i.e., at a stoppage of action in a game. Alternatively, the bettor may be allowed to exercise the option at any time during the period of time leading up to the selected exercise time. Other variations are possible. As another example, of the offered choices of exercise/expiry times offered to a bettor for a given option, one or more of the exercise/expiry times may have different criteria as to how and/or when the bettor may exercise the option.

According to further example aspects of this example sell back option, a bettor may place a bet and pay the wager amount W with cash, using an established account, points, such as comp points, credits, etc. Similarly, the bettor may purchase the option with cash, using an established account, points, such as comp points, credits, etc. Similarly, the refund amount R may be paid to the bettor in cash, crediting of an account, in points, such as comp points, credits, etc. According to one example, the user may place the wager, purchase the option, and receive the refund in different forms: place the wager in cash, purchase the option with credits, receive the refund in comp points. According to another example, if the wager and/or option is placed in one form, the refund amount R may be required to be paid in the same form. Other variations are possible.

According to another example of this sell back option as applied to football for example (although other sports and/or events may apply), in connection with making/placing a wager with wager amount W and/or subsequently thereto, a bettor may be presented the possibility of purchasing an option to purge/cancel the wager for a refund amount R which may be a defined percentage of the wager amount W. The defined percentage may be a value between 20-30%, such as 25%. In addition, the bettor may be presented with up to four and/or possibly more (or less) exercise/expiry times, each with a different price:

Cost $A: The bettor may exercise the option at any time up to, and possibly including, the end of the first quarter (e.g., before the start of the second quarter) for a refund of $25.

Cost $B: The bettor may exercise the option at any time up to, and possibly including, the end of the second quarter (e.g., before the start of the third quarter) for a refund of $25.

Cost $C: The bettor may exercise the option at any time up to, and possibly including, the end of the third quarter (e.g., before the start of the fourth quarter) for a refund of $25.

Cost $D: The bettor may exercise the option at any time up to, and possibly including, the 2 minute warning in the fourth quarter (e.g., before the start of play after the 2 minute warning) for a refund of $25.

Cost A may be a cost between $2.40 and $2.60, such as $2.50, cost B may be a cost between $5.40 and $5.60, such as $5.50, cost C may be a cost between $8.90 and $9.10, such as $9.00, and cost D may be a cost between $12.40 and $12.60, such as $12.50. Other variations are possible. Other costs and percentages may be used.

Each of a wager and/or an associated sell back option according to the present example may be presented to, purchased by, and/or exercised by a bettor through the use of one or more computing systems, through the use of one or more employees/agents (of a sports book for example) or any combination thereof as similarly discussed herein for other example sell back options. For example, each of a wager and/or an associated sell back option may be presented to, purchased by, and/or exercised by a bettor through the use of system 100 and/or 200 and/or one or more employees/agents (of a sports book for example). For example, each of a wager and/or an associated sell back option according to the present example may be presented to, purchased by, and/or exercised by a bettor entirely electronically, entirely through the use of one or more employees/agents (of a sports book for example) (such as over the counter), or some combination thereof. Similarly, each of a wager and/or an associated sell back option according to the present example may be managed electronically, such as through the use of system 100 and/or 200, by one or more employees/agents (of a sports book for example), or any combination thereof.

One skilled in the art will recognize that the above described characteristics of this example option are merely examples and that other variations are possible, including the application to sports and to events other than sports.

Figure 9:
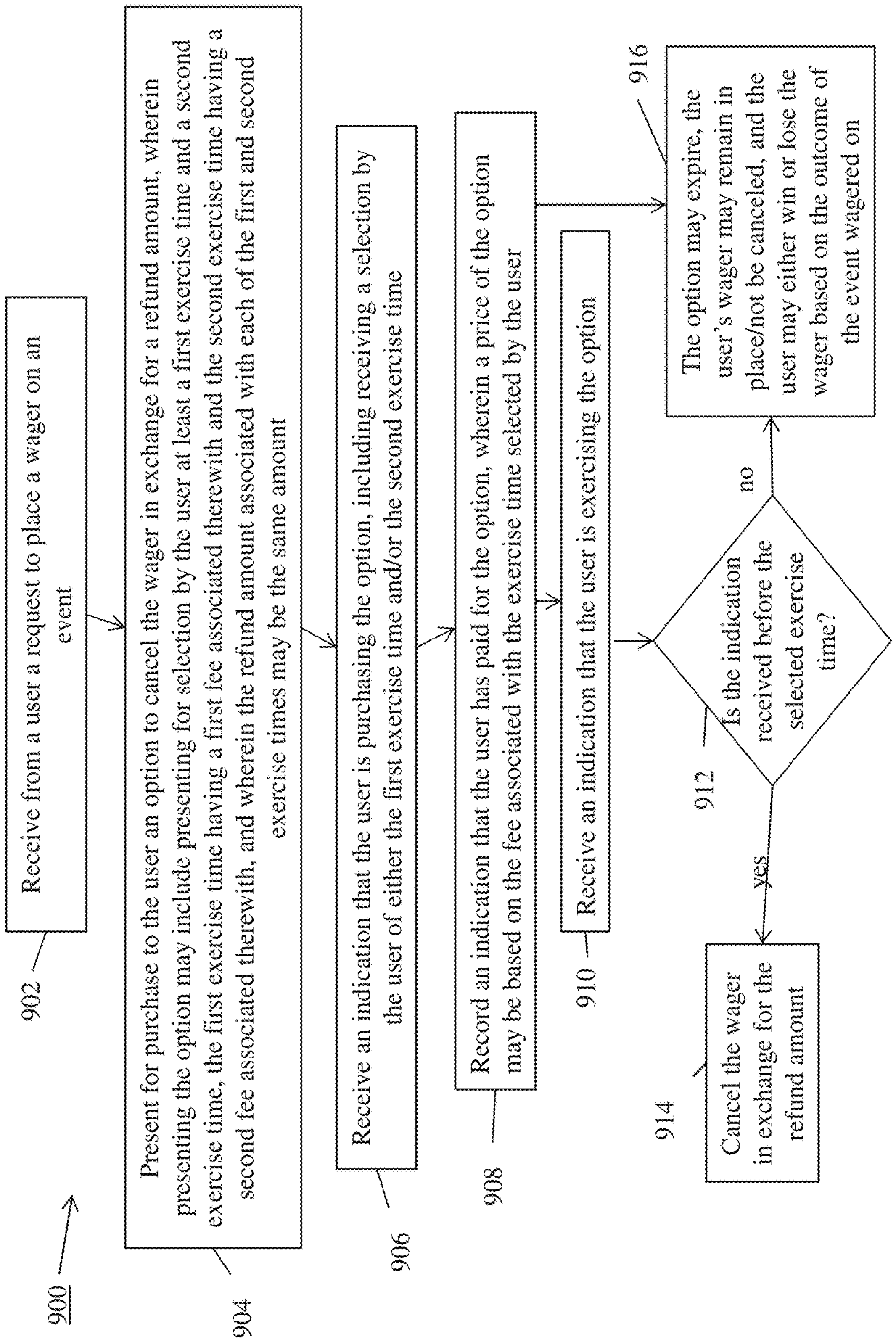
FIG. 9 is a flow diagram showing an example for offering, purchasing, and exercising an option.

Referring now to FIG. 9, there is shown an example method 900 for offering, purchasing, and exercising an option. At step 902, a request to place a wager on an event may be received from a user. At step 904, an option to cancel the wager in exchange for a refund amount may be presented for purchase to the user. Presenting the option may include presenting for selection by the user at least a first exercise time and a second exercise time, the first exercise time having a first fee associated therewith and the second exercise time having a second fee associated therewith. A price of the option may be based on the fee associated with the exercise time selected by the user. Selection of the first exercise time may allow the user to cancel the wager at least prior to the first exercise time in exchange for the refund amount, and selection of the second exercise time may allow the user to cancel the wager at least prior to the second exercise time in exchange for the refund amount. The refund amount associated with each of the first and second exercise times may be the same amount. At step 906, an indication may be received that the user is purchasing the option. With the purchase, a selection by the user of either the first exercise time and/or the second exercise time may also be received. At step 908, an indication may be recorded (such as in/on a memory device, paper, etc.) that the user has paid for the option, the price of the option being based on, for example, the fee associated with the exercise time selected by the user. At step 910, an indication may be received that the user is exercising the option. A determination may then be made as to when the indication is received as compared to the exercise time (step 912). If the indication is received at least prior to the selected exercise time, at step 914 the wager may be canceled in exchange for the refund amount. In the alternative, if the indication is received after the selected exercise time, for example, at step 916 the option may expire, the user's wager may remain in place/not be canceled, and the user may either win or lose the wager based on the outcome of the event wagered on. As another alternative, the selected exercise time may pass without the user exercising the option/without receiving an indication that the user is exercising the option. Again, at step 916 the option may expire, the user's wager may remain in place/may not be canceled, and the user may either win or lose the wager based on the outcome of the event wagered on.

Figure 10:
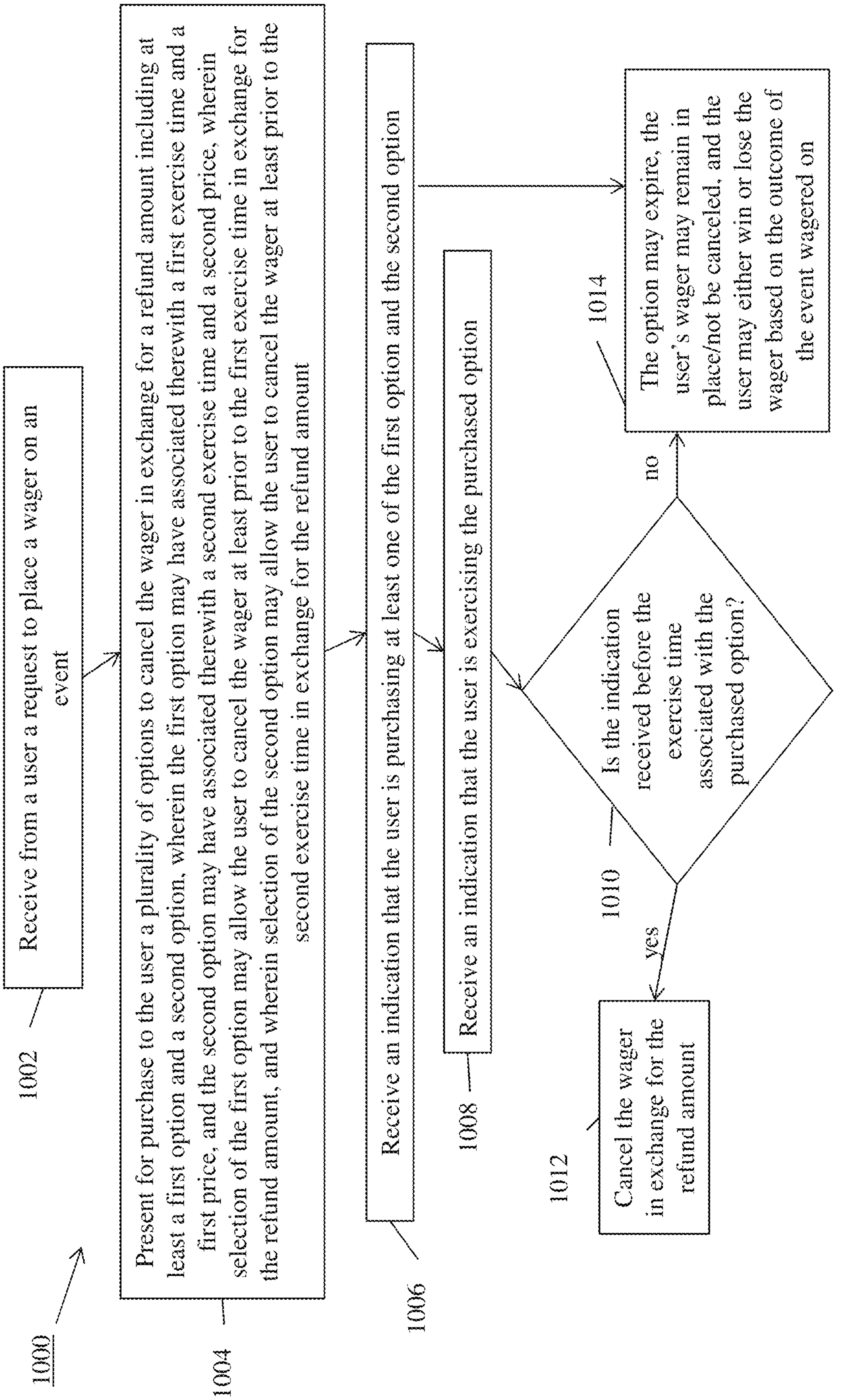
FIG. 10 is another flow diagram showing an example for offering, purchasing, and exercising an option.

Referring now to FIG. 10, there is shown another example method 1000 for offering, purchasing, and exercising an option. At step 1002, a request to place a wager on an event may be received from a user. At step 1004, a plurality of options to cancel the wager in exchange for a refund amount may be presented to the user, the plurality of options including at least a first option and a second option. The first option may have associated therewith a first exercise time and a first price, and the second option may have associated therewith a second exercise time and a second price. Selection of the first option may allow the user to cancel the wager at least prior to the first exercise time in exchange for the refund amount, and selection of the second option may allow the user to cancel the wager at least prior to the second exercise time in exchange for the refund amount. The refund amount associated with each of the first and second options may be the same amount. At step 1006, an indication may be received that the user is purchasing at least one of the first option and the second option. At step 1008, an indication may be received that the user is exercising the purchased option. A determination may then be made as to when the indication is received as compared to the exercise time associated with the purchased option (step 1010). If the indication is received at least prior to the exercise time associated with the purchased option, at step 1012 the wager may be canceled in exchange for the refund amount. In the alternative, if the indication is received after the exercise time associated with the purchased option, for example, at step 1014 the option may expire, the user's wager may remain in place/not be canceled, and the user may either win or lose the wager based on the outcome of the event wagered on. As another alternative, the exercise time associated with the purchased option may pass without the user exercising the purchased option/without receiving an indication that the user is exercising the purchased option. Again, at step 1014 the option may expire, the user's wager may remain in place/may not be canceled, and the user may either win or lose the wager based on the outcome of the event wagered on.

Sell Back Option with Multiple Exercise Times

According to another example of a sell back option, in connection with a bettor/patron/user placing/making a wager on an event for a wager amount W and/or subsequently thereto, a bettor may be presented with an opportunity to purchase an option for a price P to cancel/purge/sell back the wager in return for a refund amount/refund payment/cancelation amount/cancelation payment of R. The option, according to this example, may have a plurality (e.g., two or more) of exercise/expiry times associated with it. For example, there may be four exercise/expiry times (although fewer or more exercise times may be used) such as: a first exercise time of X1, a second exercise time of X2, a third exercise time of X3, and a fourth exercise time of X4, or in other words, an option with four exercise times of X1, X2, X3, and X4. According to this example, exercise/expiry time X4 may be subsequent to/after exercise/expiry time X3, exercise/expiry time X3 may be subsequent to/after exercise/expiry time X2, and exercise/expiry time X2 may be subsequent to/after exercise/expiry time X1, although other variations are possible. Accordingly, if a bettor purchases the option, the bettor may exercise the option/cancel the wager according to any one of the exercise times X1, X2, X3, and/or X4. According to an aspect of this example, regardless of which exercise/expiry time the bettor may eventually choose to exercise the option against, the price P of the option may be the same. According to a further aspect of this example option, each exercise time may have a refund amount associated with it, such as exercise time X1 having a refund amount R1, exercise time X2 having a refund amount R2, exercise time X3 having refund amount R3, and exercise time X4 having a refund amount R4. According to this example, one or more of refund amounts R1, R2, R3, and R4 may be different and in particular, each of refund amounts R1, R2, R3, and R4 may be different. According to one example, R1 may be more than R2, R2 may be more than R3, and R3 may be more than R4. In other words, a longer expiry time may have a smaller refund amount. Nonetheless, other variations are possible including R1 being less than R2, R2 being less than R3, and R3 being less than R4. Hence, according to this example option, given an event wagered on of a certain duration, for example, the refund amount a bettor receives for exercising the option is based on, for example, when into the event the option is exercised or in other words, how much time is remaining in the event when the option is exercised.

Hence, according to this example sell back option a bettor, in connection with placing/making a wager and/or subsequently thereto, may purchase an option for a price P to cancel/purge the wager. At the time the option is presented, an associated table for example, of exercise/expiry times, such as exercise/expiry times X1, X2, X3, and X4 (where, e.g., $X1<X2<X3<X4$), associated with the option may also be presented to the bettor. For each exercise/expiry time, the bettor may also be presented with an associated refund amount, such as R1, R2, R3, and R4. Hence, assuming the bettor purchases the option for a price P, the bettor may subsequently choose to do any one (or more) of:

Exercise the option (thereby canceling/purging/selling back the wager) at some time up to and/or including exercise time X1 and receive in return refund amount R1;

Exercise the option (thereby canceling/purging/selling back the wager) at some time at and/or after X1 and up to and/or including exercise time X2 and receive in return refund amount R2;

Exercise the option (thereby canceling/purging/selling back the wager) at some time at and/or after X2 and up to and/or including exercise time X3 and receive in return refund amount R3;

Exercise the option (thereby canceling/purging/selling back the wager) at some time at and/or after X3 and up to and/or including exercise time X4 and receive in return refund amount R4; or Not exercise the option, leaving the wager in place, and either winning or losing the wager based on the outcome of the event wagered on.

One skilled in the art will recognize that the above described characteristics of this example option are merely examples and that other variations are possible, including the application to sports and to events other than sports.

As an example, a bettor may place a $100 wager on a football game, such as the Packers vs. the Bears. In connection with making/placing this wager and or subsequently thereto, the bettor may be presented the possibility of purchasing an option to purge/cancel the wager for a price, such as $10. The option may also include four exercise/expiry times, each with a different refund amount:

Exercise Time 1: The bettor may exercise the option at any time up to, and possibly including, the end of the first quarter (e.g., before the start of the second quarter) for a refund of $25.

Exercise time 2: The bettor may exercise the option at any time at and/or after the end of the first quarter and up to, and possibly including, the end of the second quarter (e.g., before the start of the third quarter) for a refund of $20.

Exercise time 3: The bettor can exercise the option at any time at and/or after the end of the second quarter and up to, and possibly including, the end of the third quarter (e.g., before the start of the fourth quarter) for a refund of $15.

Exercise time 4: The bettor can exercise the option at any time at and/or after the end of the third quarter and up to, and possibly including, the 2 minute warning in the fourth quarter (e.g., before the start of play after the 2 minute warning) for a refund of $10.

Turning to further example aspects of this example sell back option, the refund/cancelation amounts R that a bettor may be offered for each exercise/expiry time of a given option and may subsequently receive upon exercising the option may be predetermined amounts. In other words, at the time the offer to purchase the option is made to the bettor/at the time the bettor is contemplating the purchase of the option, the refund amounts may be determined and may be conveyed to the bettor such that if the bettor were to purchase the option and later decide to exercise the option, the bettor may know the refund amount he/she will receive based on when the option is exercised. The refund amounts may be guaranteed amounts.

As similarly discussed herein, one or more of the refund amounts for each of the associated exercise times of a given option may be a set/constant amount, may be a function of the amount wagered W (e.g., each refund amount may be a set percentage of the wager amount R), may be a function of the payout/potential payout on the wager, may vary depending on when the option is purchased, may or may not vary across games/events of the same and/or different types, etc., or any combination thereof. Again, if the refund amounts are a function of the wager amount and/or payout, a ceiling amount may be used as similarly discussed herein. As also discussed herein, a sell back option according to this example may not be made available to a bettor if the wager amount and/or payout is too large and/or unless the wager amount and/or payout is of a minimum size. Other variations are possible.

As similarly discussed herein, the price associated with this example sell back option may be a set/constant amount, regardless of the wager made/amount wagered and/or regardless of a payout/potential-estimated payout a bettor may stand to win. Hence, each bettor may be presented with the same price. A sports book, for example, may set the price. According to another and/or additional example, the price may be determined as a function of the wager amount W of the wager associated with the option and/or as a function of the payout/potential-estimated payout a bettor may stand to win on the wager associated with the option. Again, if the price is a function of the wager amount and/or payout, a ceiling amount may be used as similarly discussed herein. As a further and/or additional example, the price may vary depending on when the option is purchased by a bettor, may or may not vary across games/events of the same and/or different types, etc., or any combination thereof. Other variations are possible.

As similarly discussed herein, the exercise/expiry times for a given option according to this example may be defined in various fashions, including one or more exercise times being defined in different fashions. For example, one or more of the exercise/expiry times associated with the option may be a specific time of day and another may be a specified time during an event such as end of a quarter in football. As another example, one or more of the exercise/expiry times may be before the start of an event and/or during the event the option is associated with. Other variations are possible.

According to further example aspects of this example sell back option, the option may be offered to a bettor in connection with the bettor placing/making a wager on an event and/or subsequently thereto. In either instance, the bettor may be required to purchase the option when offered, or may be given the opportunity to purchase the option at a later time. According to one example, there may be a set time when the option is no longer available for purchase. As discussed herein, for example, the option may be available for purchase up to sometime before and/or including the start of an event, some set time into the event, etc. The option may be available for purchase up to sometime before the first exercise/expiry time offered in connection with the option. Other variations are possible.

According to another and/or additional example, the number of exercise/expiry times associated with an option may change/vary depending on when the offer to purchase the option is made to a bettor and/or when a bettor decides to purchase the option. For example, referring again to the example option discussed herein offered in connection with the Packers vs. the Bears, when a bettor places a wager on the game, the bettor may be offered the possibility to purchase the option along with the four exercise/expiry times. Assuming the bettor declines to purchase the option at that time, but then later decides he/she would like to purchase the option, one, two, or three of the exercise/expiry times may no longer be associated with the option. For example, the option may no longer include "Exercise time 1". This may occur for example, if the end of the first quarter is too close to and/or has already occurred at the time the bettor decides to purchase the option. As another example, assuming a first bettor places a wager on the game at one time and a second bettor places a wager on the game at later second time, the second bettor may be offered an option with fewer exercise/expiry times than the first bettor. For example, the first bettor may be offered an option with all four exercise/expiry times, while the second bettor may be offered an option with three, two, or just one of the exercise/expiry times. This may occur for example, if the first bettor places a wager well before the start of the game and the second bettor places a wager after the start of the game, such as to close to and/or after the first quarter. Other variations are possible.

According to further example aspects of this example sell back option, once a bettor has purchased the option, there may be designated points (e.g., discrete points) during the period of time leading up to each exercise time at which the bettor may exercise the option. For example, the bettor may be allowed to exercise an option only between plays, i.e., at a stoppage of action in a game. Alternatively, the bettor may be allowed to exercise the option at any time during the period of time leading up to an exercise time. Other variations are possible. As another example, one or more of the exercise/expiry times associated with an option may have different criteria as to how and/or when the bettor may exercise the option.

Each of a wager and/or an associated sell back option according to the present example may be presented to, purchased, and/or exercised by a bettor through the use of one or more computing systems, through the use of one or more employees/agents (of a sports book for example) or any combination thereof as similarly discussed herein for other example sell back options. For example, each of a wager and/or an associated sell back option may be presented to, purchased, and/or exercised by a bettor through the use of system 100 and/or 200 and/or one or more employees/agents (of a sports book for example). For example, each of a wager and/or an associated sell back option according to the present example may be presented to, purchased, and/or exercised by a bettor entirely electronically, entirely through the use of one or more employees/agents (of a sports book for example) (such as over the counter), or some combination thereof. Similarly, each of a wager and/or an associated sell back option according to the present example may be managed electronically, such as through the use of system 100 and/or 200, by one or more employees/agents (of a sports book for example), or any combination thereof.

Figure 11:
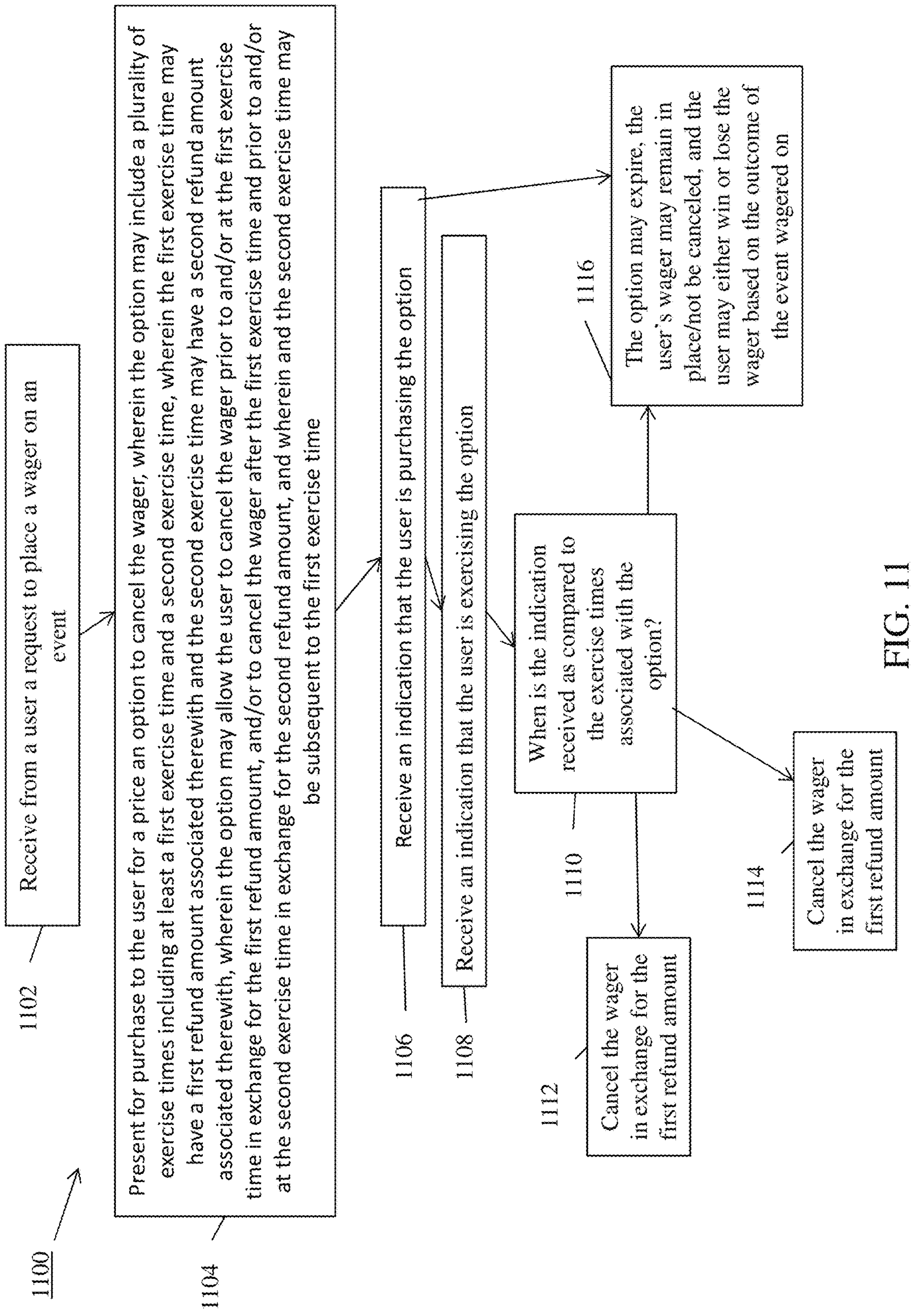
FIG. 11 is a further flow diagram showing an example for offering, purchasing, and exercising an option.

Referring now to FIG. 11, there is shown an example method 1100 for offering, purchasing, and exercising an option. At step 1102, a request to place a wager on an event may be received from a user. At step 1104, an option to cancel the wager may be presented for purchase to the user for a price. The option may include a plurality of exercise times including at least a first exercise time and a second exercise time. The first exercise time may have a first refund amount associated therewith and the second exercise time may have a second refund amount associated therewith. The second exercise time may be subsequent to the first exercise time. The option may allow the user to cancel the wager prior to and/or at the first exercise time in exchange for the first refund amount, and/or to cancel the wager at and/or after the first exercise time and prior to and/or at the second exercise time in exchange for the second refund amount. At step 1106, an indication may be received that the user is purchasing the option. At step 1108, an indication may be received that the user is exercising the option. A determination may then be made as to when the indication is received as compared to the exercise times associated with the option (step 1110). If the indication is received prior to and/or at the first exercise time associated with the option, at step 1112 the wager may be canceled in exchange for the first refund amount. If the indication is received at and/or after the first exercise time and prior to and/or at the second exercise time associated with the option, at step 1114 the wager may be canceled in exchange for the second refund amount. In the alternative, if the indication is received at and/or after the second exercise time associated with the option, at step 1116 the option may expire, the user's wager may remain in place/not be canceled, and the user may either win or lose the wager based on the outcome of the event wagered on. As another alternative, all exercise times associated with the option may pass without the user exercising the option/without receiving an indication that the user is exercising the option. Again, at step 1116 the option may expire, the user's wager may remain in place/may not be canceled, and the user may either win or lose the wager based on the outcome of the event wagered on.

Option Restrictions

According to another example aspect of any of the sell back options discussed herein, for example, if a bettor purchases an option and later decides to exercise the option, the bettor may be required to use all or at least a defined portion (which portion may be set by a sports book for example) of the refund amount to place another wager or wagers. According to one example, the bettor may not be allowed to combine the refund amount with additional funds (e.g., cash, point credits, etc.) of the bettor when placing the new wager. According to another and/or additional example, the bettor may be allowed to combine the refund amount with additional funds (e.g., cash, point credits, etc.) of the bettor when placing the new wager. The bettor may be notified of the restriction at the time the bettor is presented with an opportunity to purchase an option and/or when the bettor is purchasing the option.

According to one example, at the time the bettor exercises the option, the bettor may be required to immediately use the refund amount (or a defined portion thereof) to place one or more new wagers. For example, if exercising the option electronically as discussed herein, the bettor may be presented with an interface to place a new wager(s). If exercising the option through an employee/agent (of a sports book for example), the employee/agent may require the bettor to place another wager(s).

According to another and/or additional example, at the time the bettor exercises the option, the bettor may not be required to immediately use the refund amount (or a defined portion thereof) to place one or more new wagers. On the contrary, the bettor may be given an indefinite amount of time to use the refund amount (or a defined portion thereof) to place a new wager(s). As another and/or additional example, the bettor may be given a certain time limit to use the refund amount (or a defined portion thereof) to place a new wager(s). If the bettor does not place a new wager by that time, the bettor may forfeit/lose the refund. As another example, the bettor may be given until a certain event to use the refund amount (or a defined portion thereof) to place a new wager(s). If the bettor does not place a new wager by that event, the bettor may forfeit/lose the refund. For example, if the bettor exercises an option at halftime of a football game, the bettor may have until the end of the game to place a new wager. Other events are possible.

As a further example, the bettor may be given a graduated time/event schedule to use the refund amount. For example, assuming a bettor may be required to use the entire refund amount to place new wager(s), the bettor may have the entire refund amount available for new wagers up to a time T1. After T1, the bettor may lose a defined percentage/portion of the refund amount and have until a later time T2 to use the remaining refund amount. After T2, the bettor may lose another defined percentage/portion of the refund amount and have until a later time T3 to use the remaining refund amount, etc. As one example, the bettor may only lose a portion of the refund amount at each time/event transition if the bettor has not wagered a defined portion prior to that trigger. According to another example, the bettor may lose a portion of the refund amount at each trigger regardless of what the bettor has wagered thus far. Other variations are possible. As one example, assuming the bettor has a refund amount of $10 and loses 25% of the refund amount at each of T1, T2, etc., the bettor may have $10 for new wagers up to time T1. If the bettor has failed to place a new wager by T1, from T1 to T2 the bettor may now have $7.50 to place a new wager(s), etc.

As a further and/or additional example, once a bettor decides to place a new wager(s) using the refund amount, the bettor may be required to wager/use all of the refund amount at that time on one or more wagers. As another and/or additional example, assuming the bettor may be given a set amount of time and/or until the occurrence of a defined event to use the refund amount, once the bettor decides to place a new wager(s) using the refund amount, the bettor may be required to wager/use all of the refund amount at that time on one or more wagers. As another and/or additional example, the bettor may be allowed to place wagers using the refund amount at any time prior to the set time/defined event.

According to another example aspect of any of the sell back options discussed herein, a bettor may only be able to exercise a purchased option if the bettor is winning the wager associated with the option. Alternatively, a bettor may only be able to exercise a purchased option if the bettor is losing the wager associated with the option.

Figure 12:
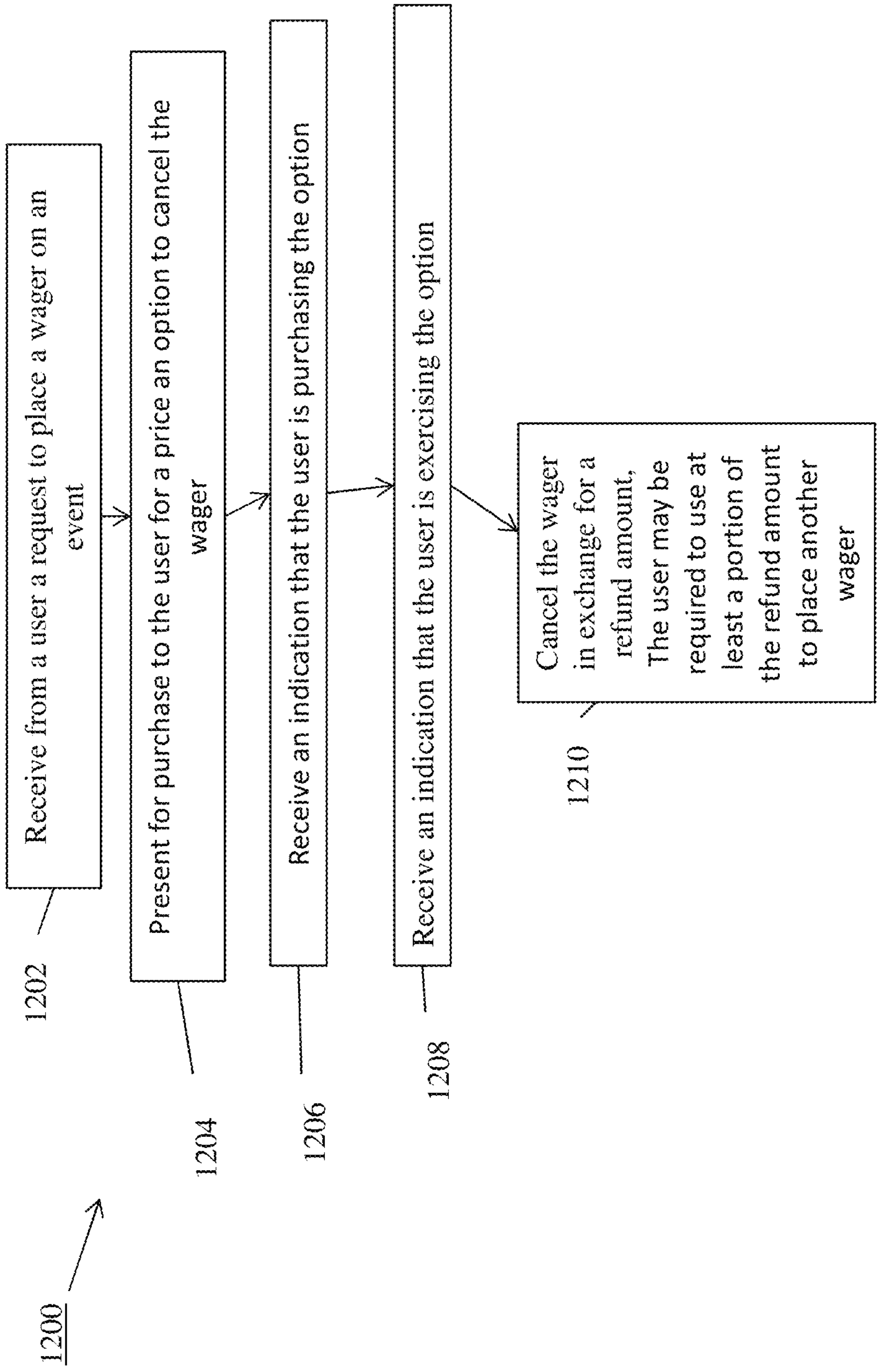
FIG. 12 is a still further flow diagram showing an example for offering, purchasing, and exercising an option.

Referring now to FIG. 12, there is shown an example method 1200 for offering, purchasing, and exercising an option. At step 1202, a request to place a wager on an event may be received from a user. At step 1204, an option to cancel the wager may be presented for purchase to the user for a price. At step 1206, an indication may be received that the user is purchasing the option. At step 1208, an indication may be received that the user is exercising the option. At step 1210, responsive to the user exercising the option, the wager may be canceled in exchange for a refund amount. The user may be required to use at least a portion of the refund amount to place another wager.

Figure 13:
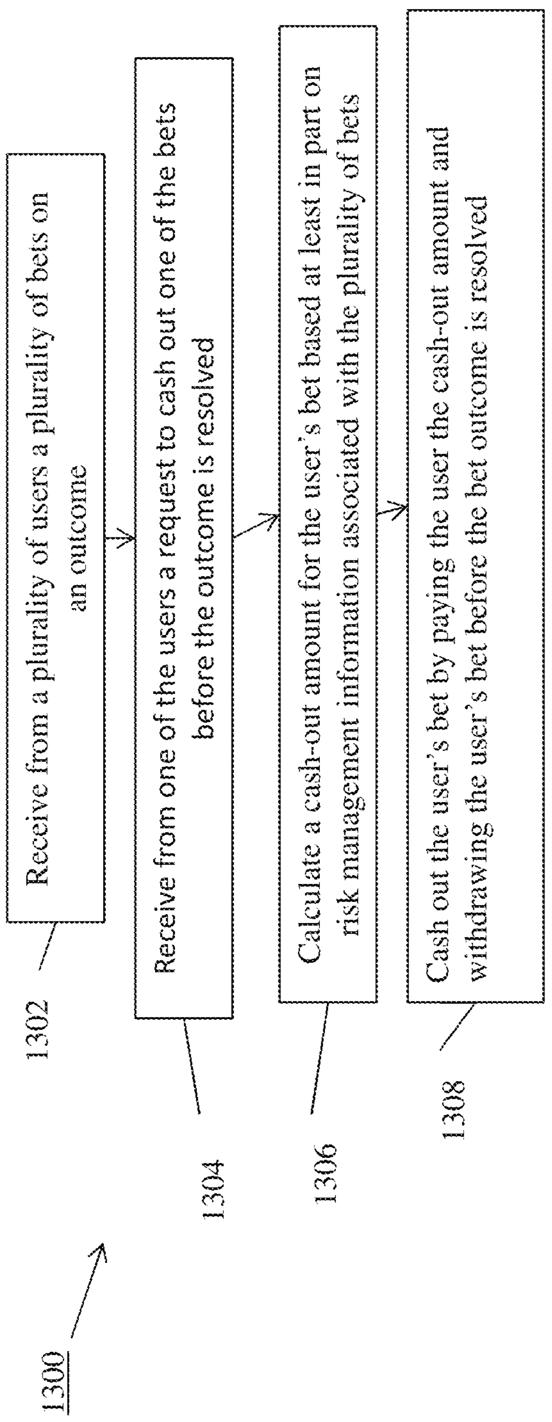
FIG. 13 is a flow diagram showing an exemplary embodiment of the invention.

FIG. 13 is a still further flow diagram showing a process for cashing out a bet.

In block 1302, a plurality of bets on an outcome may be received, e.g., by a house entity, e.g., via a server. The plurality of bets may comprise one or more bets that a specific outcome will occur. In some embodiments, the plurality of bets may also comprise one or more bets that are mutually inconsistent with the specific outcome occurring. The plurality of bets may comprise a book of bets concerning an event.

In some embodiments, an option to cash out the bet before the bet is resolved may also be received (e.g., a bettor may purchase such an option as described herein).

In block 1304, a request to cash out one of the bets before the bet outcome is resolved (e.g., before an end of the game) may be received, e.g., from a user/bettor. The request may be received by an entity associated with the house.

In some embodiments, the request may be received in connection with an option to cash out the bet that was previously purchased by the bettor. In some embodiments, the request may be received responsive to an invitation to request a cash out. In some embodiments, an invitation to cash out a bet may be provided to bettors holding bets that tend to imbalance a book of bets.

In block 1306, a cash-out amount may be calculated for the user's bet based at least in part on risk management information associated with the plurality of bets.

In block 1308, the user's bet may be cashed out by paying the user the cash-out amount and withdrawing (or canceling, etc.) the user's bet before the outcome is resolved.

It should be appreciated that the communications described herein may be via computer interface, such as a touch screen. For example, a user's screen may display an indicia indicating an opportunity to cash out, e.g., including a calculated cash out price. The user may press a button on the touch screen to request the cash out. Cash out confirmation may be displayed on the screen.

Figure 14:
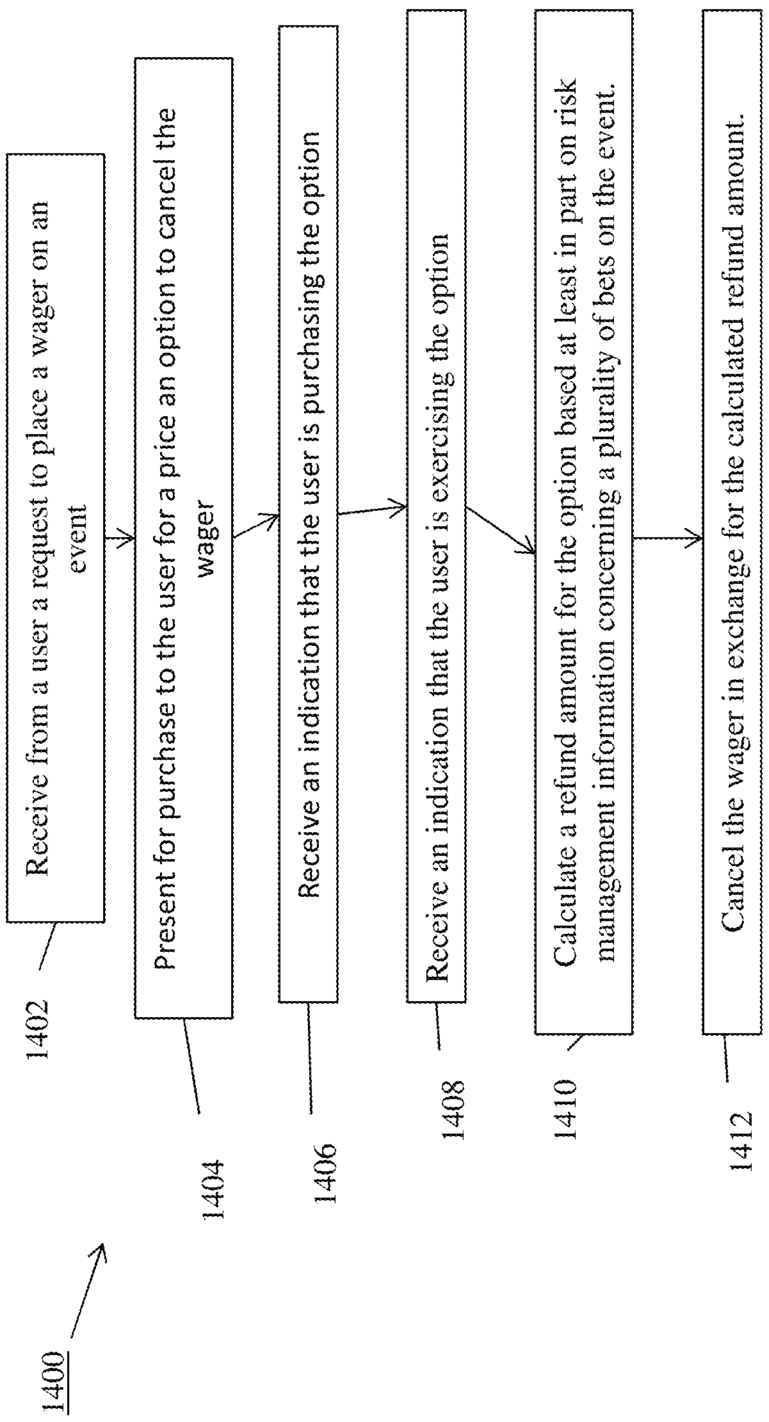
FIG. 14 is a flow diagram showing an exemplary embodiment of the invention.

FIG. 14 is a still further flow diagram showing a process for cashing out a bet.

In block 1402, a request to place a wager on an event may be received from a user, e.g., by a server associated with a house.

In block 1404, an option to cancel the wager may be presented to the user for purchase.

In block 1406, an indication that the user is purchasing the option may be received.

In block 1408, an indication that the user is exercising the option may be received, e.g., by the server.

In block 14010, a refund (or sell back) amount may be calculated for the option based at least in part on risk management information concerning a plurality of bets on the event.

In block 1412, the wager may be cancelled (e.g., or withdrawn or voided, etc.) in exchange for the calculated refund amount.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary sports book wagering computer system described above. In some embodiments, one or more of the payment disbursement computer systems and the sports book wagering computer system may be one system or controlled by one entity. Also, in some embodiments, the features and functionality described above may be implemented on one stand-alone system.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as portable disks and memory, hard disk drives, DVDs, CD ROMs, digital tape, and computer memory; and other non-transitory computer-readable storage media.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

receiving from a user a request to place a wager on an event;

presenting for purchase before a start of an event to the user an option to cancel the wager in exchange for a refund amount, wherein presenting the option includes presenting for selection by the user at least a first exercise time and a second exercise time, the first exercise time having a first fee associated therewith and the second exercise time having a second fee associated therewith, wherein the first fee, the second fee, and the refund amount for the first exercise time and the second exercise time are determined at the time of presenting the option, wherein a price of the option is based on the fee associated with the exercise time selected by the user, wherein selection of the first exercise time allows the user to cancel the wager at least prior to the first exercise time in exchange for the refund amount, wherein selection of the second exercise time allows the user to cancel the wager at least prior to the second exercise time in exchange for the refund amount, and receiving an indication that the user is purchasing the option at a particular time, including receiving a selection by the user of either the first exercise time or the second exercise time;

recording an indication that the user has paid for the option, wherein a price of the option is based on the fee associated with the exercise time selected by the user;

at least prior to the selected exercise time, receiving an indication that the user is exercising the option; and responsive to the user exercising the option, cancelling the wager in exchange for the refund amount, wherein the refund amount associated with each of the first and second exercise times is based on an amount of time before the start of the event that the option is purchased.

2. The method of claim 1, wherein the refund amount is a first amount if the option is purchased within a specific set time before the start of the event and a second amount if the option is purchased after the specific set time before the start of the event.

3. The method of claim 1, wherein the refund amount is further calculated by: comparing (i) an amount of total potential liability associated with paying payouts on winning wagers resulting from the event outcome and (ii) an amount of total potential proceeds associated with losing wagers resulting from the event outcome.

4. The method of claim 1, in which the user is given a time limit to use at least a portion of the refund amount to place another wager or forfeit the portion of the refund amount.

5. The method of claim 1, wherein the refund amount is further calculated by:

determining that (i) a potential total liability of payouts, in response to a specific wager outcome occurring, exceeds (ii) potential total proceeds for losing wagers, in response to the specific wager outcome occurring.

6. An apparatus comprising:

at least one processor configured to:

receive before a start of an event, over a communication network, from a first remote device a request to place at least one wager on an outcome of an event and a request to purchase an option to receive a refund amount in exchange for cancelling the at least one wager before a first time having a first fee or before a second time having a second fee;

cause to be presented, over the communication network to the first remote device, at a graphical user interface of a display device of the first remote device, indicia representing the option to receive the refund amount at the first time or the second time in exchange for cancelling the at least one wager, wherein the first fee, the second fee, and the refund amount for the first time and the second time are determined at the time of presenting the graphical user interface; and record an indication that the first remote device paid for the option, wherein a price of the option is based on the first fee or the second fee associated with the first time or second time selected by the first remote device;

responsive to the first remote device paying for the option, cancel the at least one wager in exchange for the refund amount, wherein the refund amount associated with each of the first and second times is based on an amount of time before a start of the event that the option is purchased.

7. The apparatus of claim 6, wherein the refund amount is a first amount if the option is purchased within a specific set time before the start of the event and a second amount if the option is purchased after the specific set time before the start of the event.

8. The apparatus of claim 6, wherein the refund amount is further calculated by: comparing (i) an amount of total potential liability associated with paying payouts on winning wagers resulting from the event outcome and (ii) an amount of total potential proceeds associated with losing wagers resulting from the event outcome.

9. The apparatus of claim 6, in which the first remote device is given a time limit to use at least a portion of the refund amount to place another wager or forfeit the portion of the refund amount.

10. The apparatus of claim 6, in which the at least one processor is configured to:

in response to the first remote device exercising the option, present, over the communication network, the first remote device with the graphical user interface to place another wager using at least a portion of the refund amount.

11. The apparatus of claim 6, wherein the refund amount is further calculated by:

determining that (i) a potential total liability of payouts, in response to a specific wager outcome occurring, exceeds (ii) potential total proceeds for losing wagers, in response to the specific wager outcome occurring.

12. A non-transitory computer-readable medium having instructions stored thereon which, when executed by at least one processor, controls the at least one processor to:

receive, over a communication network, from a first remote device a request to place at least one wager on an outcome of an event and a request to purchase an option to receive a refund amount in exchange for cancelling the at least one wager at a first time having a first fee or a second time having a second fee;

cause to be presented before a start of an event, over the communication network to the first remote device, at a graphical user interface of a display device of the first remote device, indicia representing the option to receive the refund amount at the first time or the second time in exchange for cancelling the at least one wager, wherein the first fee, the second fee, and the refund amount for the first time and the second time are determined at the time of presenting the option; and record an indication that the first remote device paid for the option, wherein a price of the option is based on the first fee or the second fee associated with the first time or second time selected by the first remote device;

responsive to the first remote device paying for the option, cancel the at least one wager in exchange for the refund amount, wherein the refund amount associated with each of the first and second times is based on an amount of time before the start of the event that the option is purchased.

13. The non-transitory computer-readable medium of claim 12, in which the instructions, when executed by the at least one processor, control to:

calculate the refund amount by comparing (i) the amount of total potential liability associated with paying payouts on winning wagers resulting from the outcome occurring and (ii) an amount of total potential proceeds associated with losing wagers resulting from the outcome occurring.

14. The non-transitory computer-readable medium of claim 12, in which the instructions, when executed by the at least one processor, control to:

calculate the refund amount by determining that (i) a potential total liability of payouts, in response to a specific wager outcome occurring, exceeds (ii) potential total proceeds for losing wagers, in response to the specific wager outcome occurring.

15. The non-transitory computer-readable medium of claim 12, in which the instructions, when executed by the at least one processor, control to:

present, over the communication network, the first remote device with the graphical user interface to place another wager using at least a portion of the refund amount in response to the first remote device exercising the option, in which the first remote device is given a time limit to use a portion of the refund amount to place another wager or forfeit the portion of the refund amount.

* * * * *